United States Patent
Leather et al.

(10) Patent No.: US 6,636,214 B1
(45) Date of Patent: Oct. 21, 2003

(54) METHOD AND APPARATUS FOR DYNAMICALLY RECONFIGURING THE ORDER OF HIDDEN SURFACE PROCESSING BASED ON RENDERING MODE

(75) Inventors: Mark M. Leather, Saratoga, CA (US); Farhad Fouladi, Los Altos Hills, CA (US)

(73) Assignee: Nintendo Co., Ltd., Kyoto (JP)

( * ) Notice: Subject to any disclaimer, the term of this patent is extended or adjusted under 35 U.S.C. 154(b) by 166 days.

(21) Appl. No.: 09/726,227

(22) Filed: Nov. 28, 2000

Related U.S. Application Data

(60) Provisional application No. 60/226,890, filed on Aug. 23, 2000.

(51) Int. Cl.[7] .................................................. G06T 15/40
(52) U.S. Cl. ........................ 345/422; 345/421; 345/502; 345/506; 345/532; 345/536; 345/582
(58) Field of Search ................................ 345/506, 532, 345/536, 421, 422, 502, 582

(56) References Cited

U.S. PATENT DOCUMENTS

| | | |
|---|---|---|
| 4,275,413 A | 6/1981 | Sakamoto et al. |
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |

(List continued on next page.)

FOREIGN PATENT DOCUMENTS

| | | |
|---|---|---|
| CA | 2070934 | 12/1993 |
| EP | 0 637 813 A2 | 2/1995 |
| EP | 1 074 945 | 2/2001 |

(List continued on next page.)

OTHER PUBLICATIONS

Neider, Jackie et al., "OpenGl Programming Guide, The Official Guide to Learning OpenGL, Release 1," p. 204, Addison–Wesley Publishing Company (1993).

(List continued on next page.)

*Primary Examiner*—Mark Zimmerman
*Assistant Examiner*—Kimbinh T. Nguyen
(74) *Attorney, Agent, or Firm*—Nixon & Vanderhye P.C

(57) ABSTRACT

A graphics system including a custom graphics and audio processor produces exciting 2D and 3D graphics and surround sound. The system includes a graphics and audio processor including a 3D graphics pipeline and an audio digital signal processor. A reconfigurable graphics pipeline has a hidden surface removal stage that may be placed at different locations within the pipeline depending on pipeline rendering mode. When the pipeline operates in certain rendering modes, the hidden surface removal operation can be performed early in the pipeline—allowing the pipeline to avoid wasting its time imaging obstructed surfaces. For other (e.g., alpha based) rendering modes, the hidden surface removal operation is performed near the end of the pipeline—when the pipeline has developed sufficient additional information required by the particular rendering mode to resolve depth comparisons.

13 Claims, 19 Drawing Sheets

Simplified Graphics Pipeline with No Alpha Thresholding

U.S. PATENT DOCUMENTS

| | | |
|---|---|---|
| 4,710,876 A | 12/1987 | Cline et al. |
| 4,725,831 A | 2/1988 | Coleman |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,721,947 A | 2/1998 | Priem et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,727,192 A | 3/1998 | Baldwin |
| 5,734,386 A | 3/1998 | Cosman |

| | | | | | | |
|---|---|---|---|---|---|---|
| 5,739,819 A | 4/1998 | Bar-Nahum | | 5,874,969 A | 2/1999 | Storm et al. |
| 5,740,343 A | 4/1998 | Tarolli et al. | | 5,877,741 A | 3/1999 | Chee et al. |
| 5,740,383 A | 4/1998 | Nally et al. | | 5,877,770 A | 3/1999 | Hanaoka |
| 5,740,406 A | 4/1998 | Rosenthal et al. | | 5,877,771 A | 3/1999 | Drebin et al. |
| 5,742,749 A | 4/1998 | Foran et al. | | 5,880,736 A | 3/1999 | Peercy et al. |
| 5,742,788 A | 4/1998 | Priem et al. | | 5,880,737 A | 3/1999 | Griffin et al. |
| 5,745,118 A | 4/1998 | Alcorn et al. | | 5,883,638 A | 3/1999 | Rouet et al. |
| 5,745,125 A | 4/1998 | Deering et al. | | 5,886,701 A | 3/1999 | Chauvin et al. |
| 5,748,199 A | 5/1998 | Palm | | 5,886,705 A | 3/1999 | Lentz |
| 5,748,986 A | 5/1998 | Butterfield et al. | | 5,887,155 A | 3/1999 | Laidig |
| 5,751,291 A | 5/1998 | Olsen et al. | | 5,890,190 A | 3/1999 | Rutman |
| 5,751,292 A | 5/1998 | Emmot | | 5,892,517 A | 4/1999 | Rich |
| 5,751,295 A | 5/1998 | Becklund et al. | | 5,892,974 A | 4/1999 | Koizumi et al. |
| 5,751,930 A | 5/1998 | Katsura et al. | | 5,894,300 A | 4/1999 | Takizawa |
| 5,754,191 A | 5/1998 | Mills et al. | | 5,900,881 A | 5/1999 | Ikedo |
| 5,757,382 A | 5/1998 | Lee | | 5,903,283 A | 5/1999 | Selwan et al. |
| 5,758,182 A | 5/1998 | Rosenthal et al. | | 5,909,218 A | 6/1999 | Naka et al. |
| 5,760,783 A | 6/1998 | Migdal et al. | | 5,909,225 A | 6/1999 | Schinnerer et al. |
| 5,764,228 A | 6/1998 | Baldwin | | 5,912,675 A | 6/1999 | Laperriere |
| 5,764,237 A | 6/1998 | Kaneko | | 5,912,676 A | 6/1999 | Malladi et al. |
| 5,764,243 A | 6/1998 | Baldwin | | 5,914,721 A | 6/1999 | Lim |
| 5,767,856 A | 6/1998 | Peterson et al. | | 5,914,725 A | 6/1999 | MacInnis et al. |
| 5,767,858 A | 6/1998 | Kawase et al. | | 5,914,729 A | 6/1999 | Lippincott |
| 5,768,626 A | 6/1998 | Munson et al. | | 5,917,496 A | 6/1999 | Fujita et al. |
| 5,768,629 A | 6/1998 | Wise et al. | | 5,920,326 A | 7/1999 | Rentschler et al. |
| 5,774,133 A | 6/1998 | Neave et al. | | 5,920,876 A | 7/1999 | Ungar et al. |
| 5,777,623 A | 7/1998 | Small | | 5,923,332 A | 7/1999 | Izawa |
| 5,777,629 A | 7/1998 | Baldwin | | 5,923,334 A | 7/1999 | Luken |
| 5,781,927 A | 7/1998 | Wu et al. | | 5,926,182 A | 7/1999 | Menon et al. |
| 5,791,994 A | 8/1998 | Hirano et al. | | 5,926,647 A | 7/1999 | Adams et al. |
| 5,798,770 A | 8/1998 | Baldwin | | 5,933,150 A | 8/1999 | Ngo et al. |
| 5,801,706 A | 9/1998 | Fujita et al. | | 5,933,154 A | 8/1999 | Howard et al. |
| 5,801,711 A | 9/1998 | Koss et al. | | 5,933,155 A | 8/1999 | Akeley |
| 5,801,716 A | 9/1998 | Silverbrook | | 5,933,529 A | 8/1999 | Kim |
| 5,801,720 A | 9/1998 | Norrod et al. | | 5,936,641 A | 8/1999 | Jain et al. |
| 5,805,175 A | 9/1998 | Priem | | 5,936,683 A | 8/1999 | Lin |
| 5,805,868 A | 9/1998 | Murphy | | 5,940,086 A | 8/1999 | Rentschler et al. |
| 5,808,619 A | 9/1998 | Choi et al. | | 5,940,089 A | 8/1999 | Dilliplane |
| 5,808,630 A | 9/1998 | Pannell | | 5,940,538 A | 8/1999 | Spiegel et al. |
| 5,809,219 A | 9/1998 | Pearce et al. | | 5,943,058 A | 8/1999 | Nagy |
| 5,809,278 A | 9/1998 | Watanabe et al. | | 5,943,060 A | 8/1999 | Cosman et al. |
| 5,815,165 A | 9/1998 | Blixt | | 5,945,997 A | 8/1999 | Zhao et al. |
| 5,815,166 A | 9/1998 | Baldwin | | 5,949,421 A | 9/1999 | Ogletree et al. |
| 5,818,456 A | 10/1998 | Cosman et al. | | 5,949,423 A | 9/1999 | Olsen |
| 5,819,017 A | 10/1998 | Akeley et al. | | 5,949,424 A | 9/1999 | Cabral et al. |
| 5,821,940 A | 10/1998 | Morgan et al. | | 5,949,428 A | 9/1999 | Toelle et al. |
| 5,821,949 A | 10/1998 | Deering | | 5,949,440 A | 9/1999 | Krech, Jr. et al. |
| 5,822,516 A | 10/1998 | Krech, Jr. | | 5,956,042 A | 9/1999 | Tucker et al. |
| 5,828,382 A | 10/1998 | Wilde | | 5,956,043 A | 9/1999 | Jensen |
| 5,828,383 A | 10/1998 | May et al. | | 5,958,020 A | 9/1999 | Evoy et al. |
| 5,828,907 A | 10/1998 | Wise et al. | | 5,959,640 A | 9/1999 | Rudin et al. |
| 5,831,624 A | 11/1998 | Tarolli et al. | | 5,963,220 A | 10/1999 | Lee et al. |
| 5,831,625 A | 11/1998 | Rich et al. | | 5,966,134 A | 10/1999 | Arias |
| 5,831,640 A | 11/1998 | Wang et al. | | 5,969,726 A | 10/1999 | Rentschler et al. |
| 5,835,096 A | 11/1998 | Baldwin | | 5,977,979 A | 11/1999 | Clough et al. |
| 5,835,792 A | 11/1998 | Wise et al. | | 5,977,984 A | 11/1999 | Omori |
| 5,838,334 A | 11/1998 | Dye | | 5,982,376 A | 11/1999 | Abe et al. |
| 5,844,576 A | 12/1998 | Wilde et al. | | 5,982,390 A | 11/1999 | Stoneking et al. |
| 5,850,229 A | 12/1998 | Edelsbrunner et al. | | 5,986,659 A | 11/1999 | Gallery et al. |
| 5,852,451 A | 12/1998 | Cox et al. | | 5,986,663 A | 11/1999 | Wilde |
| 5,856,829 A | 1/1999 | Gray, III et al. | | 5,986,677 A | 11/1999 | Jones et al. |
| 5,859,645 A | 1/1999 | Latham | | 5,987,567 A | 11/1999 | Rivard et al. |
| 5,861,888 A | 1/1999 | Dempsey | | 5,990,903 A | 11/1999 | Donovan |
| 5,861,893 A | 1/1999 | Strugess | | 5,995,120 A | 11/1999 | Dye |
| 5,867,166 A | 2/1999 | Myhrvold et al. | | 5,995,121 A | 11/1999 | Alcokrn et al. |
| 5,870,097 A | 2/1999 | Snyder et al. | | 5,999,189 A | 12/1999 | Kajiya et al. |
| 5,870,098 A | 2/1999 | Gardiner | | 5,999,196 A | 12/1999 | Storm et al. |
| 5,870,102 A | 2/1999 | Tarolli et al. | | 5,999,198 A | 12/1999 | Horan et al. |
| 5,870,109 A | 2/1999 | McCormack et al. | | 6,002,407 A | 12/1999 | Fadden |
| 5,870,587 A | 2/1999 | Danforth et al. | | 6,002,409 A | 12/1999 | Harkin |
| 5,872,902 A | 2/1999 | Kuchkuda et al. | | 6,002,410 A | 12/1999 | Battle |

| | | |
|---|---|---|
| 6,005,582 A | 12/1999 | Gabriel et al. |
| 6,005,583 A | 12/1999 | Morrison |
| 6,005,584 A | 12/1999 | Kitamura et al. |
| 6,007,428 A | 12/1999 | Nishiumi et al. |
| 6,008,820 A | 12/1999 | Chauvin et al. |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengyel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugajin |
| 6,023,738 A | 2/2000 | Priem et al. |
| 6,025,853 A | 2/2000 | Baldwin |
| 6,026,182 A | 2/2000 | Lee et al. |
| 6,028,608 A | 2/2000 | Jenkins |
| 6,028,611 A | 2/2000 | Anderson et al. |
| 6,031,542 A | 2/2000 | Wittig |
| 6,035,360 A | 3/2000 | Doidge et al. |
| 6,037,948 A | 3/2000 | Liepa |
| 6,037,949 A | 3/2000 | DeRose et al. |
| 6,038,031 A | 3/2000 | Murphy |
| 6,038,348 A | 3/2000 | Carley |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A | 4/2000 | Deering |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,852 A | 5/2000 | Krech, Jr. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,124 A | 7/2000 | Priem et al. |
| 6,092,158 A | 7/2000 | Harriman et al. |
| 6,094,200 A | 7/2000 | Olsen et al. |

| | | | |
|---|---|---|---|
| 6,097,435 A | 8/2000 | Stanger et al. | |
| 6,097,437 A | 8/2000 | Hwang | |
| 6,104,415 A | 8/2000 | Gossett | |
| 6,104,417 A | 8/2000 | Nielsen et al. | |
| 6,105,094 A | 8/2000 | Lindeman | |
| 6,108,743 A | 8/2000 | Debs et al. | |
| 6,111,582 A | 8/2000 | Jenkins | |
| 6,111,584 A * | 8/2000 | Murphy | 345/582 |
| 6,115,047 A | 9/2000 | Deering | |
| 6,115,049 A | 9/2000 | Winner et al. | |
| 6,118,462 A | 9/2000 | Margulis | |
| 6,128,026 A | 10/2000 | Brothers, III | |
| 6,144,365 A * | 11/2000 | Young et al. | 345/600 |
| 6,144,387 A | 11/2000 | Liu et al. | |
| 6,151,602 A | 11/2000 | Hejlsberg et al. | |
| 6,155,926 A | 12/2000 | Miyamoto et al. | |
| 6,157,387 A | 12/2000 | Kotani | |
| 6,166,748 A | 12/2000 | Van Hook et al. | |
| 6,172,678 B1 | 1/2001 | Shiraishi | |
| 6,173,367 B1 | 1/2001 | Aleksic et al. | |
| 6,177,944 B1 | 1/2001 | Fowler et al. | |
| 6,181,352 B1 | 1/2001 | Kirk et al. | |
| 6,191,794 B1 | 2/2001 | Priem et al. | |
| 6,198,488 B1 | 3/2001 | Lindholm et al. | |
| 6,200,253 B1 | 3/2001 | Nishiumi et al. | |
| 6,204,851 B1 | 3/2001 | Netschke et al. | |
| 6,215,496 B1 | 4/2001 | Szeliski et al. | |
| 6,215,497 B1 | 4/2001 | Leung | |
| 6,226,012 B1 | 5/2001 | Priem et al. | |
| 6,226,713 B1 | 5/2001 | Mehrotra | |
| 6,232,981 B1 | 5/2001 | Gossett | |
| 6,236,413 B1 | 5/2001 | Gossett et al. | |
| 6,239,810 B1 | 5/2001 | Van Hook et al. | |
| 6,252,608 B1 | 6/2001 | Snyder et al. | |
| 6,252,610 B1 | 6/2001 | Hussain | |
| 6,264,558 B1 | 7/2001 | Nishiumi et al. | |
| 6,268,861 B1 | 7/2001 | Sanz-Pastor et al. | |
| 6,275,235 B1 | 8/2001 | Morgan, III | |
| 6,285,779 B1 | 9/2001 | Lapidous et al. | |
| 6,292,194 B1 | 9/2001 | Powll, III | |
| 6,329,997 B1 | 12/2001 | We et al. | |
| 6,331,856 B1 | 12/2001 | Van Hook et al. | |
| 6,339,428 B1 | 1/2002 | Fowler et al. | |
| 6,342,892 B1 | 1/2002 | Van Hook et al. | |
| 6,353,438 B1 | 3/2002 | Van Hook et al. | |
| 6,356,497 B1 | 3/2002 | Puar et al. | |
| 6,408,362 B1 | 6/2002 | Arimilli et al. | |
| 6,417,858 B1 | 7/2002 | Bosch et al. | |
| 6,426,747 B1 | 7/2002 | Hoppe et al. | |
| 6,437,781 B1 | 8/2002 | Tucker et al. | |
| 6,459,429 B1 | 10/2002 | Deering | |
| 6,466,223 B1 | 10/2002 | Dorbie et al. | |
| 6,469,707 B1 | 10/2002 | Voorhies | |
| 6,476,808 B1 | 11/2002 | Kuo et al. | |
| 6,476,822 B1 | 11/2002 | Burbank | |
| 6,496,187 B1 | 12/2002 | Deering et al. | |

FOREIGN PATENT DOCUMENTS

| | | |
|---|---|---|
| EP | 1 075 146 | 2/2001 |
| EP | 1 081 649 | 3/2001 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |

| | | |
|---|---|---|
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

Photograph of Sony Playstation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchel et al., "Multitexturing in DirectX6", Game Developer, Sep. 1998, www.gdmag.com.
VisionTek, "GeForce3 GS Graphics Processing Unit", ©2000 www.visiontek.com.
Jim Bushnell et al. "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 1, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation ©1999.
Press Release, Mar. 18, 1999.
Chris Johnston, "PlayStation Part Deux", Press Start, ©1999.
Nikkei Shimbun, "Sony Making SME, Chemical and SPT into Wholly–Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit-–Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.
Dreamcast Instruction Manual, Sega Enterprises, Ltd., ©1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot ©1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., ©1999.
Leadtek GTS, Aug. 3, 2000, www.hexus.net.
Voodoo 5 500 Review, Jul. 26, 2000, www.hexus.net.
ATI Radeon 64 Meg DDR OEM, Aug., 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second–Depth Shadow Mapping", Department of Computer Science, Univ. N.C, Chapel Hill, N.C. pp. 1–7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov., 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994, pp. 433–437.
James F. Blinn, "Simulationof Wrinkled Surfaces," Caltech/JPX, pp. 286–292, SIGGRAPH 78 (1978).
Tomas Möller and Eric Haines "Real–Time Rendering", AK Peters, Ltd., ©1999, pp. 127–142.
Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephen R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, Feb. 1999, www.game–revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer'Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addison–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000 www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" (Aug. 1, 2000).

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: www.wksoftware.com, 42 pages.

Thompson, Tom, "Must–See 3–D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 97).

"HowTo: Animate Textures in Direct3D Immediate Mode," printed from web site support.microsoft.com, 3 pages (last reviewed Dec. 15, 2000).

Info: Rendering a Triangle Using an Execute Buffer, printed from web site support.microsoft.com, 6 pages (last reviewed Oct. 20, 2000).

U.S. patent application Ser. No. 09/337,293, filed Jun. 21, 1999, Multi–Format Vertex Data Processing Apparatus and Method [issued as U.S. Pat. No. 6,501,479 B1 on Dec. 31, 2002.].

Datasheet, SGS–Thomson Microelectronics, nVIDIA™, RIVA 128™ 128–Bit 3D Multimedia Accelerator (Oct. 1997).

Product Presentation, "RIVA 128™ Leadership 3D Acceleration," 2 pages.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha–channel Transparency," Jan. 15, 1999, wysiwyg://16/ http://www4.zdnet.com...ies/reviews/0,4161,2188286, 00.html.

Alpha (transparency) Effects, Future Technology Research Index, http://www.futuretech.vuurwerk.nl/alpha.html.

Blythe, David, 5.6 Transparency Mapping and Trimming with Alpha, http://toolbox.sgi.com/TasteOfDT/d...penGL/advanced98//notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A–buffer Algorithm," Computer Graphics Proceedings, Annual Conference Series, 1997, pp 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp. 249–252 (Jul. 1992).

White paper, Kilgard, Mark J., "Improving Shadows and Reflections via the Stencil Buffer" (Nov. 3, 1999).

"OpenGL Projected Textures," from web site:HTTP://reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algorithms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Graphics, pp. 127–134 (Apr. 1999).

Hourcade et al, "Algorithms for Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic Renderman 3.8 User's Manual, Pixar (Aug. 1998).

RenderMan Interface Version 3.2 (Jun. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," ppp 289–291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp 131–137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line–drawings," Norsk samarbeid innen grafisk databehandling: NORSIGD Info, medlemsblad for NORSIGD, Nr 1/95, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.–Mar. 1998.

Zeleznik, Robert et al."SKETCH: An Interface for Sketching 3D Scenes," Computer Graphics Proceedings, Annual Conference Series 1996, pp. 163–170.

Computer Graphics World, Dec. 1997.

Reynolds, Craig, "Stylized Depiction in Computer Graphics, Non–Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998 http://www.pixar.com/products/renderman/toolkit/Toolkit/AppNotes/appnote.24.html.

Decaudin, Philippe, "Cartoon–Looking Rendering of 3D Scenes," Syntim Project Inria, 6 pages, http://www–syntim.inria.fr/syntim/recherche/decaudin/cartoon–eng.html.

Hachigian, Jennifer, "Super Cel Shader 1.00 Tips and Tricks," 2 pages wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_idx33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.cam–ani.co.uk/casweb/products/software/SceneIII.htm.

Mulligan, Vikram, Toon, info sheet, 2 pages, http://digitalcarversguild.com/products/toon/toon.thml Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic Renderman Tutorial," Pixar (Jan. 1996).

Web site materials, "Renderman Artist Tools, PhotoRealsitic RenderMan 3.8 User's Manual," Pixar.

NVIDIA.com, technical presentation, "AGDC Per–Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with ATI Rage Pro," (7 pages) from ati.com web site (2000).

Slide Presentation, Sébastien Dominé, "nVIDIA Mesh Skinning, OpenGI".

Singh, Karan et al., "Skinning Characters using Surface-–Oriented Free–Form Deformations," Toronto Canada "Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307–312.

Shade, Jonathan et al., "Layered Depth Images," Computer Graphics Proceedings, Annual Conference Series, pp. 231–242 (1998).

Videum Conference Pro (PCI) Spcification, product of Winnov (Winnov), published Jul. 21, 1999.

Hoppe, Hugues, "Optimization of Mesh Locality for Transparent Vertex Caching," Proceedings of Siggraph, pp. 269–276 (Aug. 8–13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109–116.

* cited by examiner

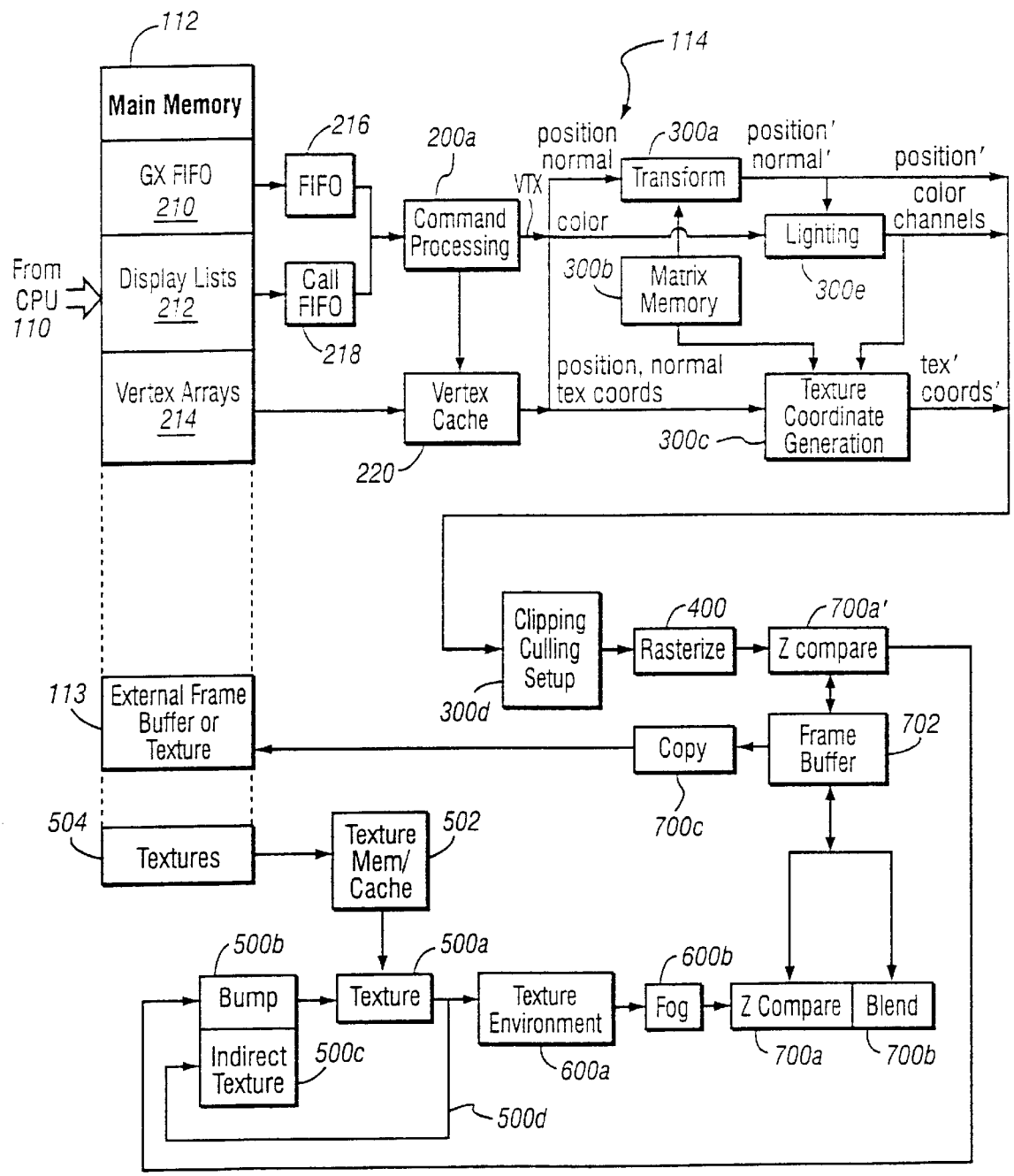
Fig. 5 EXAMPLE GRAPHICS PROCESSOR FLOW

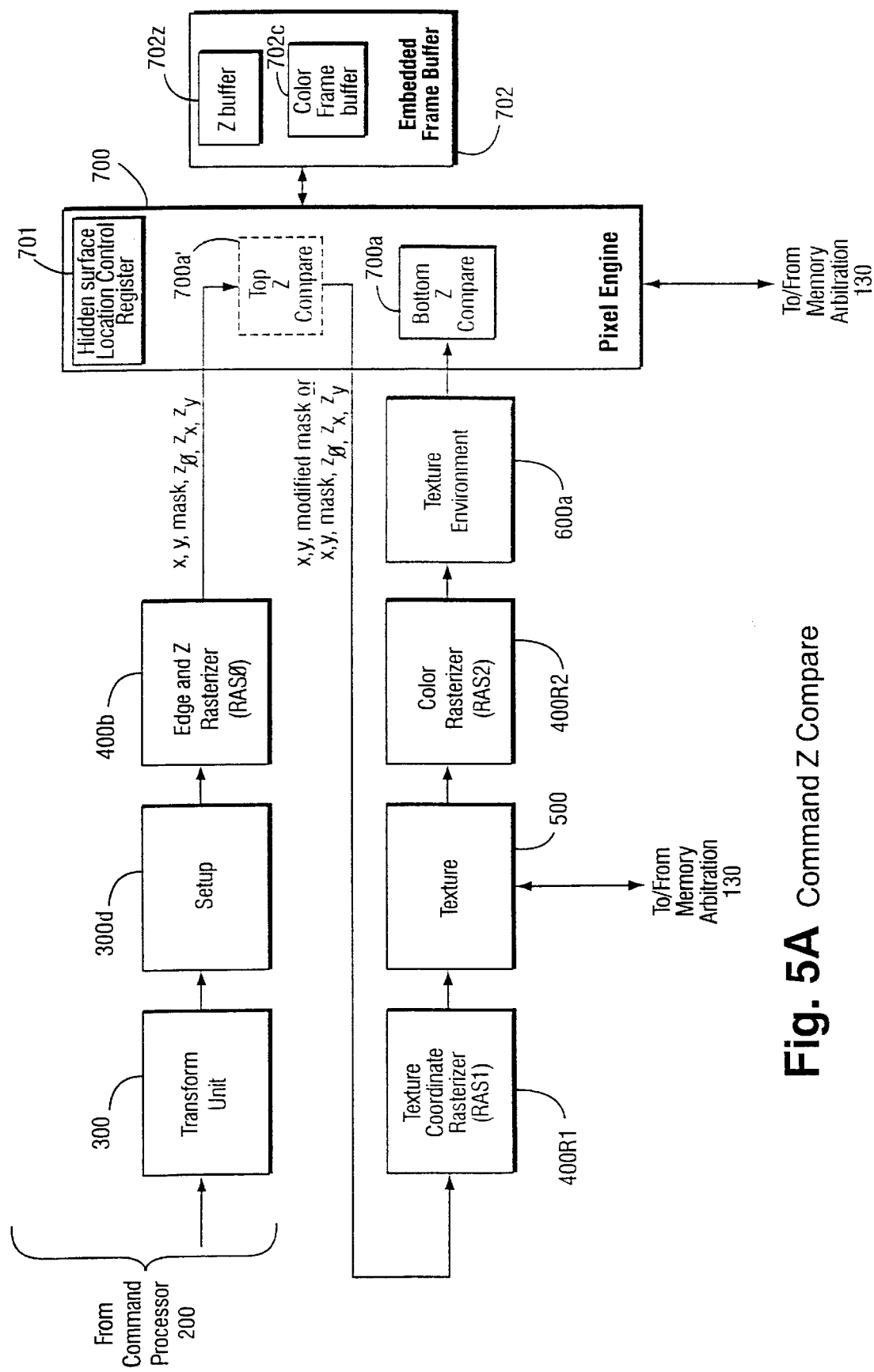
Fig. 5A Command Z Compare

Example Process To Move Z Compare

Simplified Graphics Pipeline with No Alpha Thresholding

Stall Pipeline and Insert Synchronization Token to Chase Pixels Down Pipeline

Signal when token reaches end of pipeline

Reconfigure Pipeline

Reconfigure Pipeline

Simplified Graphics pipeline reconfigured for Alpha Thresholding

Fig. 8  Example Process To Dynamically Reconfigure Pipeline Within a Scene
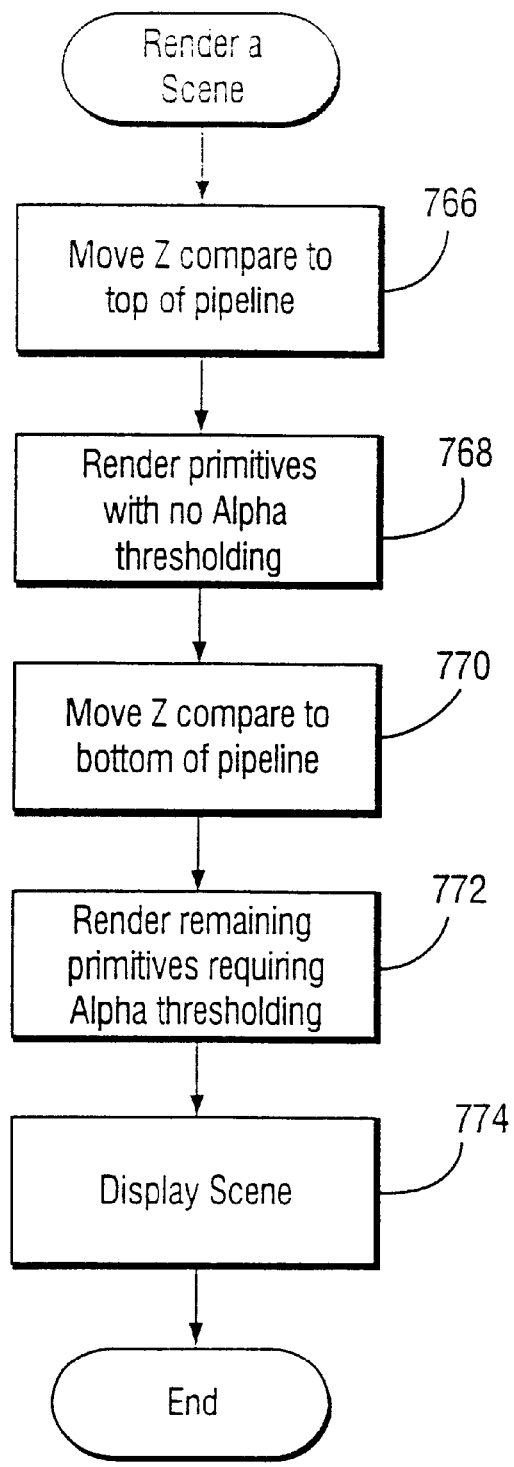

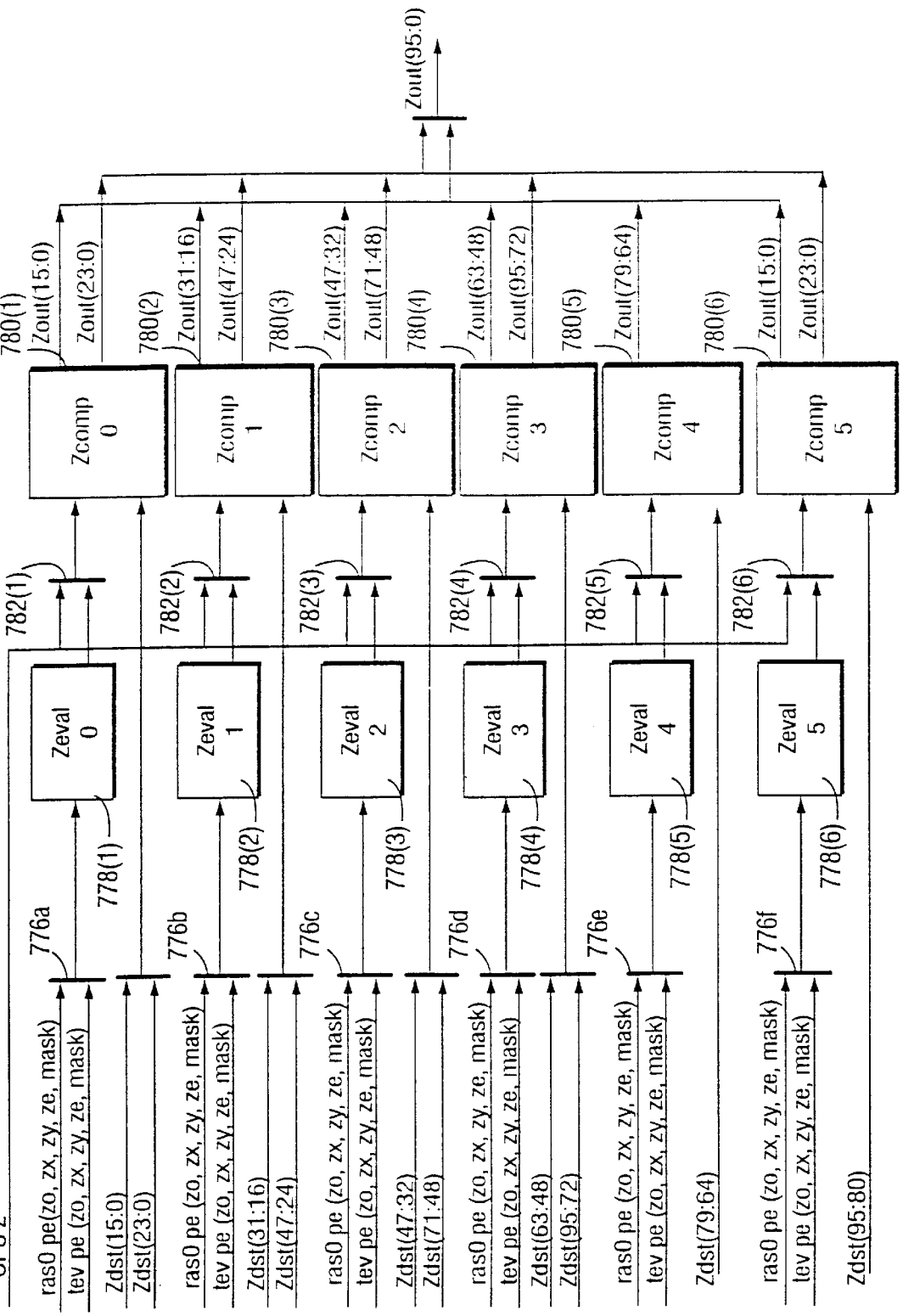
Fig. 9 Example Z Unit

Fig. 10  Example Control Register

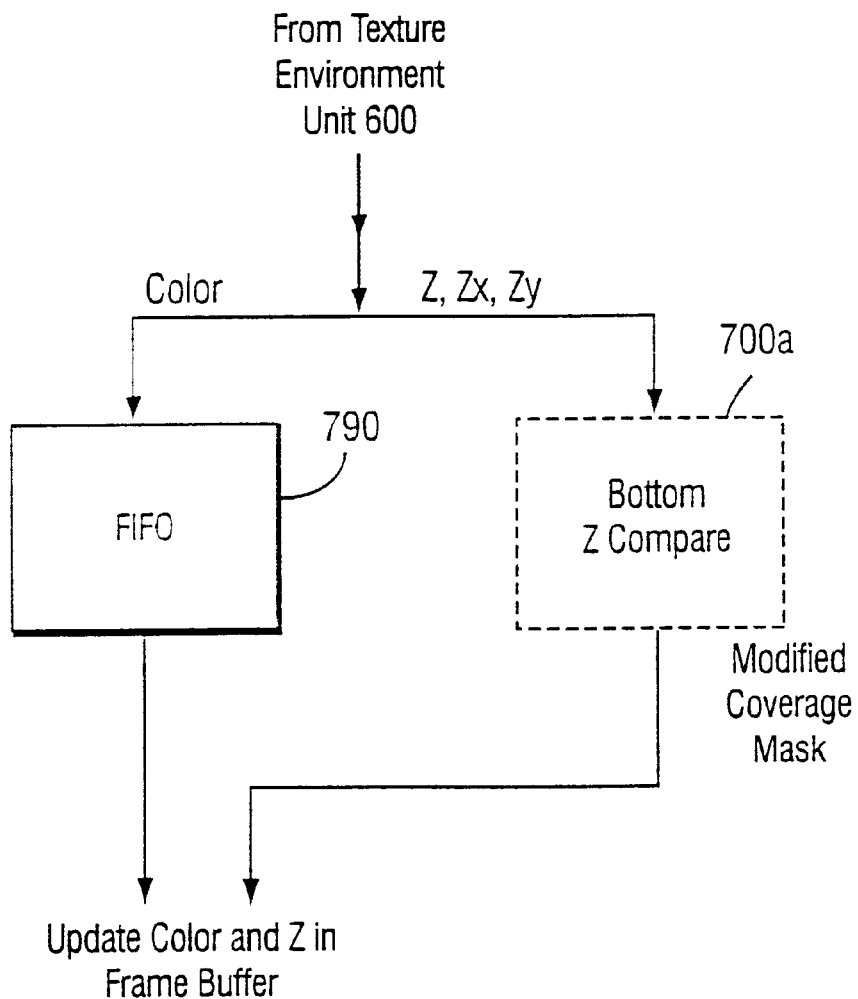
Fig. 11  Example Pipeline Balancing

METHOD AND APPARATUS FOR DYNAMICALLY RECONFIGURING THE ORDER OF HIDDEN SURFACE PROCESSING BASED ON RENDERING MODE

This application claims the benefit of U.S. Provisional Application No. 60/226,890, filed Aug. 23, 2000, the entire content of which is hereby incorporated by reference in this application.

FIELD OF THE INVENTION

The present invention relates to computer graphics, and more particularly to interactive graphics systems such as home video game platforms. Still more particularly this invention relates to reconfiguring a 3D graphics pipeline to move hidden surface removal to different locations within the pipeline depending on rendering mode (e.g., alpha thresholding).

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers are constantly confronting is how to speed up the graphics processing. Reduced image processing time is especially important in real time graphics systems such as interactive home video games and personal computers. Real time systems generally are required to produce thirty new image frames each second.

To achieve higher speed, typical modern 3D graphics systems use a graphics pipeline to render the image. Information specifying an image goes into one end of the pipeline, and the rendered image comes out at the other end of the pipeline. The pipeline includes a number of different processing stages performing the various steps involved in rendering the image (e.g., transformation to different coordinate systems, rasterization, texturing, etc.) all at the same time. Just as you can save time laundering clothes by folding one load of laundry while another load is in the washing machine and still another load is in the dryer, a graphics pipeline saves overall processing time by simultaneously performing different stages of processing as pixels move down the pipeline.

The amount of time it takes for information to get from one end of the pipeline to the other depends on the "length" of the pipeline—that is the number of processing steps the pipeline performs to generate screen pixels for display. Shorter pipelines can process information faster, but image complexity is limited by the reduced number of image processing stages. The additional image processing stages of a longer pipeline can be used to produce more complicated and interesting images at the expense of increased processing time.

A common technique in use in many modern graphics systems today to increase speed performance allows the application programmer (e.g., video game designer) to change the length of the pipeline by turning off graphics pipeline features and processing stages that are not currently being used. For example, the application programmer can selectively turn on and off optional processing operations (e.g., texturing, texture filtering, z buffering, etc.) that take a lot of time to perform. Permitting the application programmer to choose from a menu of processing operations provides great flexibility. If the application programmer is interested in the fastest possible rendering, he or she can select cheaper (in terms of processing time) pipeline processing operations and forego the increased image complexity that would be obtainable by more expensive options. An application programmer interested in more complex images can activate, on an a la carte basis, more complex and expensive functions on an as-needed basis at the cost of increased processing time.

Hidden surface removal is an expensive but important operation performed by nearly all modern 3D graphics pipelines. To create the illusion of realism, it is important for the graphics pipeline to hide surfaces that would be hidden behind other, non-see-through surfaces. Letting the viewer see through solid opaque objects would not create a very realistic image. But in the real world, not every surface behind another surface is hidden from view. For example, you can see objects through transparent objects such as window panes. To provide realism, a 3D graphics pipeline should be able to model transparent objects as well as solid (opaque) objects, and perform hidden surface removal based upon whether or not an object in front of another object is transparent. Modern graphics systems model transparency using an additional channel called the "alpha channel" and perform "alpha thresholding" and alpha blending to achieve transparency and other effects.

One common way to perform hidden surface removal is to use something called a depth buffer. The depth buffer is also called the "z buffer" because the z axis is the depth axis. The z buffer typically provides at least one storage location for each pixel (picture element) of the image. When the graphics pipeline writes a pixel on a surface into a color frame buffer that stores the image, it also writes the depth of the surface at that pixel location into a corresponding location in the z buffer. Later, when the graphics pipeline is asked to render another surface at the same image location, it compares the depth of what it has already rendered with the depth of the new surface, relative to the viewpoint. If the new surface is in front of the already rendered surface, the graphics pipeline can discard the new surface information—since the new surface will be hidden from view. If the depth of the newly presented surface is closer to the viewer, then the graphics pipeline can replace the previously rendered pixel with a new pixel for the new surface because the new surface will hide the previously rendered surface. If the new surface is transparent, then the graphics pipeline may blend the newly presented and previously-rendered surfaces together to achieve a transparency effect.

Since hidden surface removal tends to be a rather expensive operation in terms of speed performance, it is often possible to turn off hidden surface removal at certain times (e.g., while redrawing a background image or drawing certain kinds of geometry that do not require such processing). However, altogether eliminating hidden surface removal is usually not desirable because many or most 3D images require hidden surface removal to provide realism.

The texturing stage is another processing stage found in typical modern graphics pipelines. To provide an increase in image complexity without a corresponding increase in the number of polygons that the graphics pipeline must render, graphics system designers often include the ability to apply two-dimensional textures to polygon surfaces within an image. For example, when creating an image including a tree, it is possible to draw a rectangle or triangle and place a two-dimensional picture or other image of a tree onto that surface. Texturing avoids the need to model each leaf and branch of the tree with one or more polygons, and can therefore substantially save the amount of processing time required to generate images. Another example is rendering a complicated architectural surface such as a brick wall or a wood-grained tabletop. Instead of defining each grain within the tabletop or each brick within the wall, one can image a geometric primitive defining the outlines of the wall or tabletop, and insert an appropriate texture onto that surface to provide a high degree of realism without paying a corresponding speed performance penalty for modeling each brick or each wood grain.

While texture mapping saves processing resources, the texture mapping process is not "free" by any means. Rather, texture mapping can require some relatively time consuming processing (especially when texture filtering is activated), and also requires an additional memory lookup to access the texture information. However, because texturing adds a substantial degree of realism and complexity to an image at relatively low cost, oftentimes the applications programmer wants to take advantage of it—even at the expense of increased processing time.

As can be understood from the above discussion, while various techniques are known for reducing the length of a graphics pipeline, such techniques often require the graphics system designer and/or application programmer to choose between increased image complexity and increased speed performance. Accordingly, further improvements are possible and desirable.

The present invention provides a solution to this problem by providing techniques and arrangements that move the position of z (depth) buffering in a graphics pipeline depending upon rendering mode.

Performing hidden surface removal early in a rasterizing pipeline can shorten the pipeline length for certain image information. Pixels rejected by a depth comparison operation often do not need to be processed by expensive additional processing steps such as texturing because they will be discarded anyway due to the depth comparison. By placing hidden surface removal before additional operations such as texturing, we can discard pixels based on the depth comparison operation and avoid having the pipeline waste valuable time performing expensive operations on those pixels.

On the other hand, some rendering modes require expensive operations such as texturing to be performed before the hidden surface removal operations. For example, if the application programmer has chosen to activate the alpha channel for alpha thresholding (e.g., to model transparency, or provide texture alpha mapping or other alpha-based effects), then hidden surface removal should be delayed until after the alpha operations have been performed. Otherwise, the hidden surface removal operation will not properly take the results of alpha thresholding into account.

In accordance with an aspect of our invention, we provide a reconfigurable graphics pipeline with a hidden surface removal phase that may be placed at different locations within the pipeline depending on pipeline rendering mode. When the pipeline operates in certain rendering modes, the hidden surface removal operation can be performed early in the pipeline—allowing the pipeline to discard obstructed pixels early and avoid wasting its time performing expensive operations on image portions that are obstructed by other portions of the image. For other (e.g., alpha-thresholding-based) rendering modes, the hidden surface removal operation is performed near the end of the pipeline—when the pipeline has developed sufficient additional information to resolve depth comparisons based on such rendering mode.

In accordance with one aspect provided by the invention a graphics pipeline has first and second alternate rendering modes and includes a texturing stage having an input and an output. A reconfiguration arrangement selectively places a hidden surface removal stage alternately at the input or at the output of the texturing stage depending upon the graphics pipeline rendering mode.

In accordance with another aspect of the invention, a method of dynamically reconfiguring a graphics pipeline comprises selectively activating alpha thresholding. If alpha thresholding is not activated, hidden surface removal is performed before texturing. If alpha thresholding is activated, hidden surface removal is performed after texturing.

In accordance with another aspect provided by the invention, a graphics pipeline comprises at least one processing stage including selectively activatable alpha thresholding. This processing stage includes an input and an output. A hidden surface removal stage is selectively coupled to the processing stage input or the processing stage output depending at least in part on whether alpha thresholding is activated.

Another aspect of the invention provides a pixel engine including a first input coupled to a z and edge rasterizer, and a second input coupled to a texture environment unit. A z unit is selectively, alternately coupled to the first input or the second input.

Yet another aspect of the invention provides a method of synchronizing a graphics pipeline reconfiguration comprising:

receiving a command;

stalling a graphics pipeline in response to the received command, inserting a synchronization token into the graphics pipeline that chases pixels within the graphics pipeline while the pipeline is stalled, detecting when the synchronization token has reached a predetermined point in the graphics pipeline to confirm that the graphics pipeline has been flushed, reconfiguring a graphics pipeline in response to such detection to reposition a hidden surface removal stage within the pipeline, and releasing the stall.

An advantage provided by our invention is that it maintains compatibility with expected image processing protocols and APIs while realizing increased speed performance under certain circumstances. For example, the OpenGL graphics standard requires depth buffering to be performed in response to information developed by an alpha channel. As an example, one way to render translucent objects using OpenGL is to enable depth-buffering (e.g., on a read only basis) while drawing translucent objects. Under that standard, you can draw all of the opaque objects in a scene using depth buffering in normal read/write/update operation, and then preserve those depth values by making the depth buffer read-only. When the translucent objects are drawn, their depth values are still compared to the values established by the opaque objects, so they aren't drawn if they are behind the opaque ones. However, if they are closer to the viewpoint, they don't eliminate the opaque objects since the depth-buffer values don't change. Instead, they are blended with the opaque objects. The present invention accommodates the glDepthiMask type commands implementable under OpenGL still providing the flexibility of moving depth buffering to an earlier stage in the pipeline when translucency or other alpha-based effects are not activated.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 5A is a more detailed block diagram of an example rasterizing pipeline;

FIG. 8 is a flowchart of an example process for dynamically reconfiguring a graphics pipeline while it is rendering a scene;

FIG. 9 shows an example reconfigurable z unit;

FIG. 10 shows an example control register format;

FIG. 11 shows example graphics pipeline balancing; and

DETAILED DESCRIPTION OF EXAMPLE EMBODIMENTS OF THE INVENTION

Figure 1:
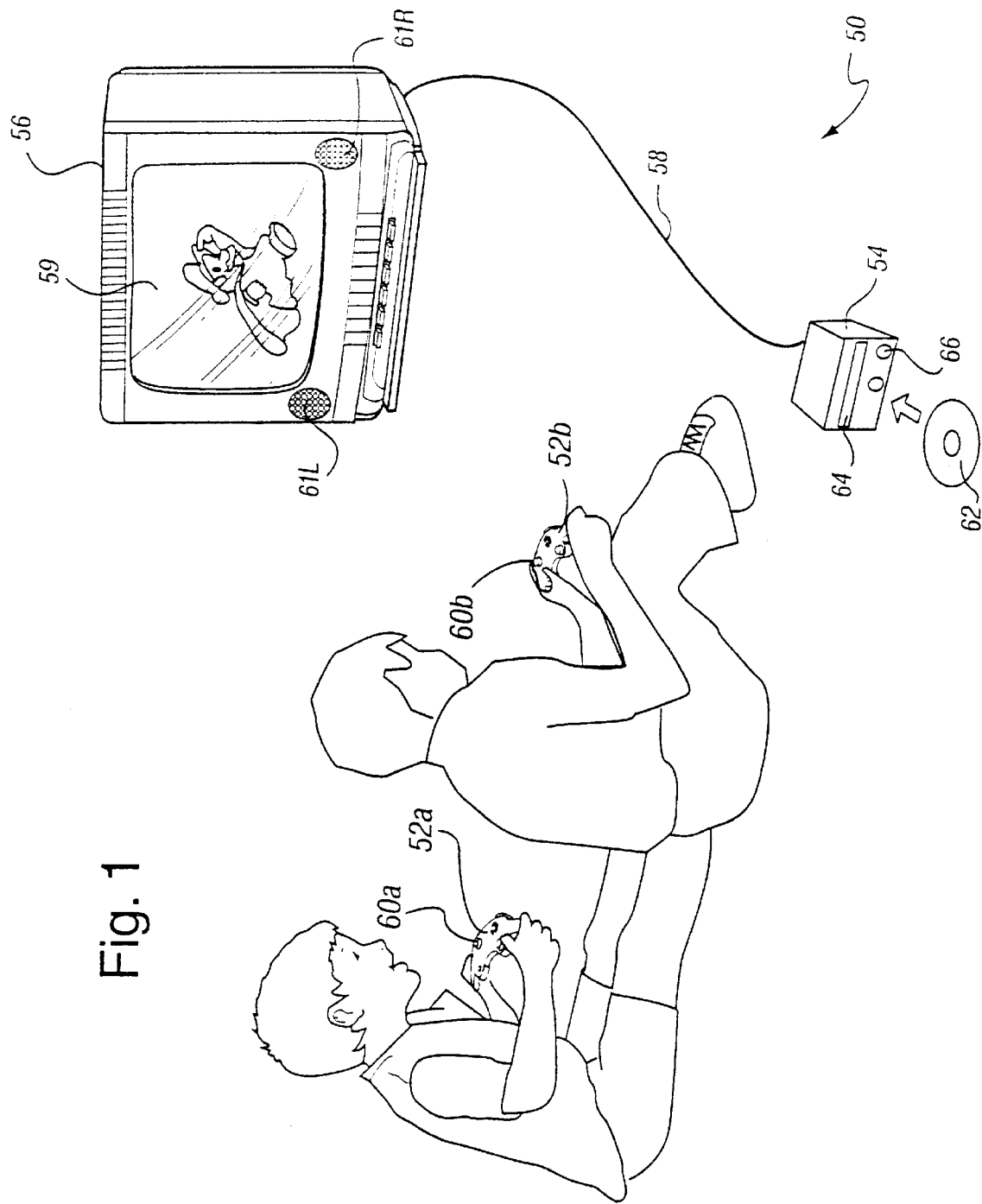
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall Systems

Figure 2:
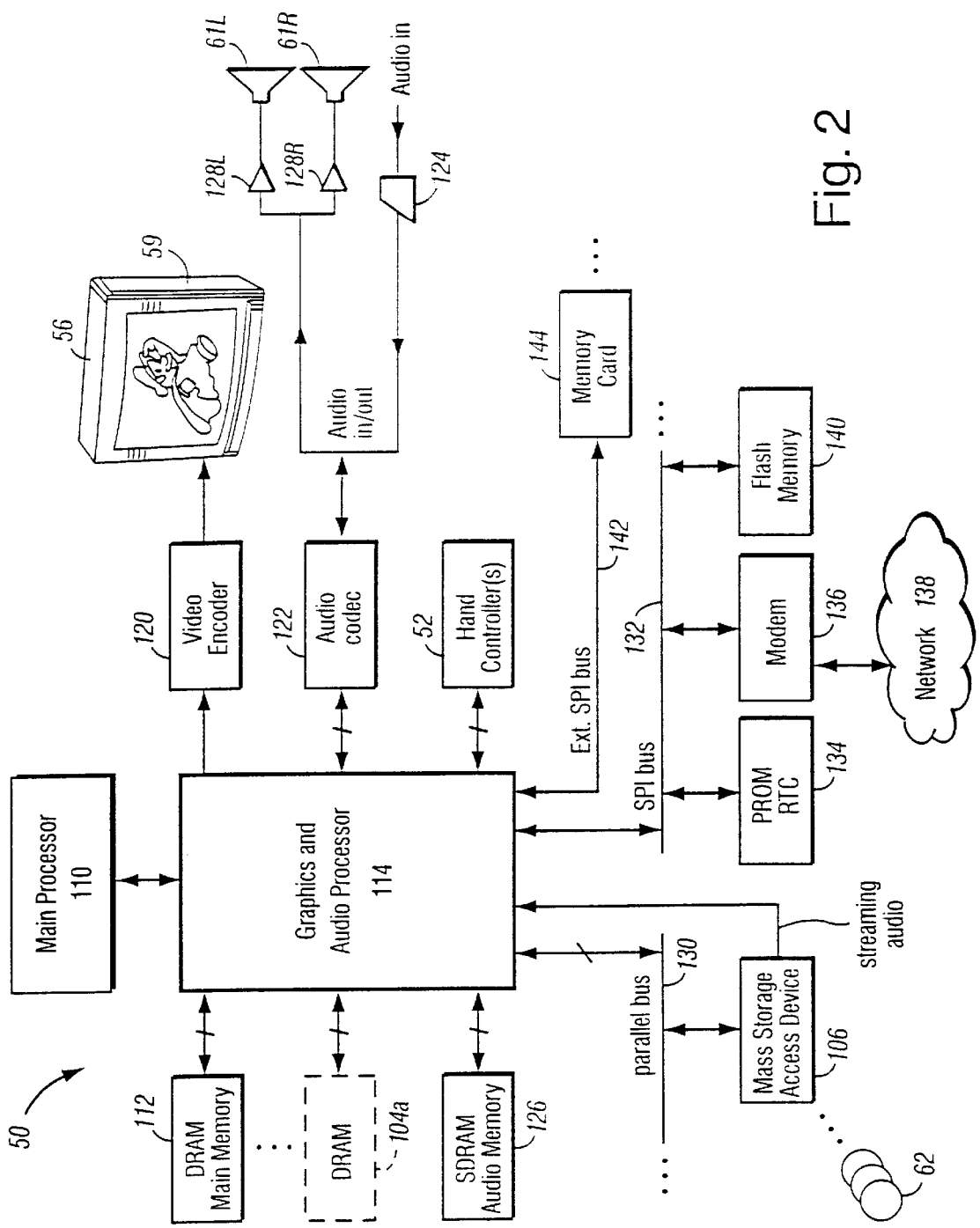
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 10 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134,
a modem 136 or other networking interface (which may in turn connect system 50 to a telecommunications network 138 such as the Internet or other digital network from/to which program instructions and/or data can be downloaded or uploaded), and
flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
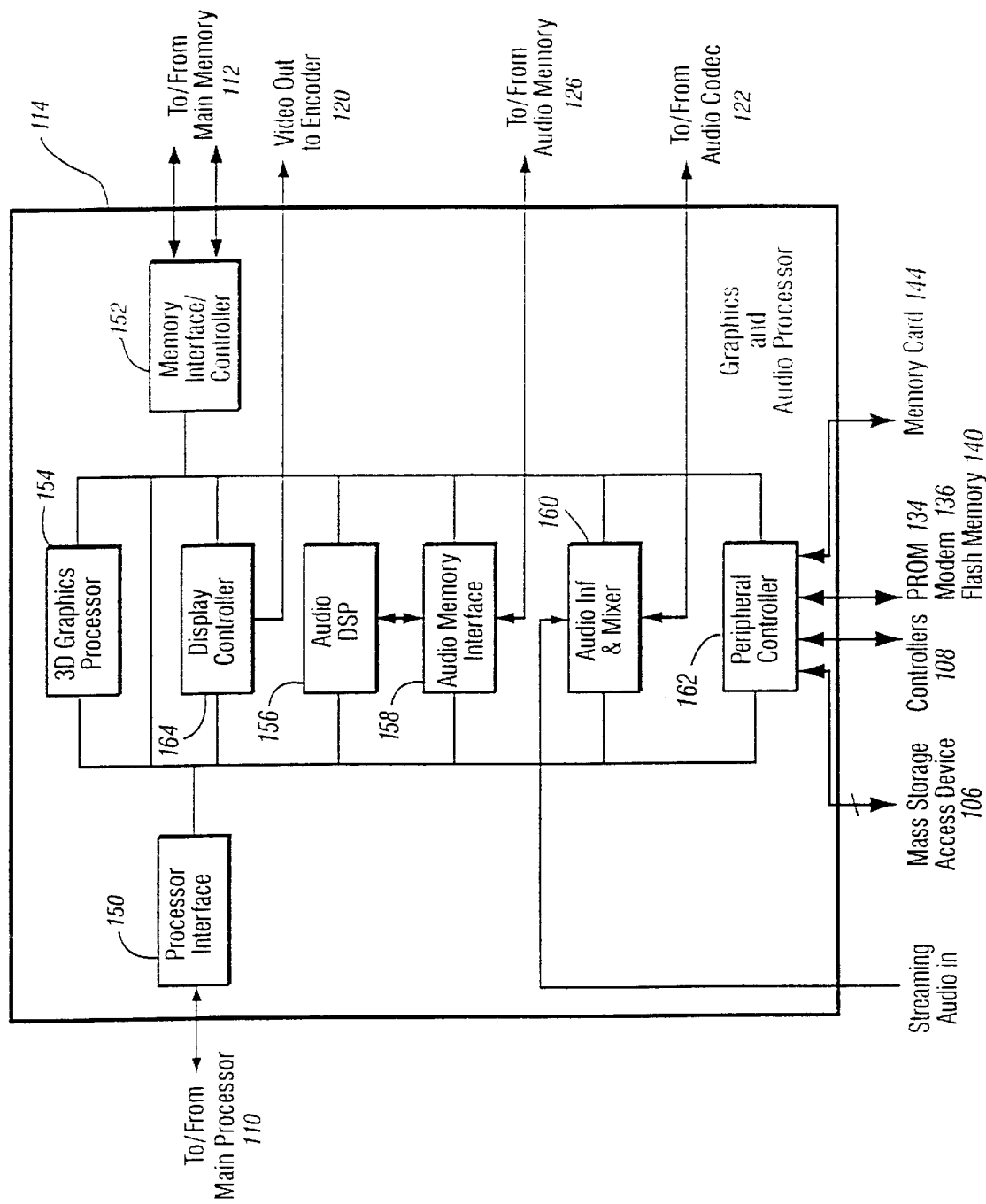
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150,
a memory interface/controller 152,
a 3D graphics processor 154,
an audio digital signal processor (DSP) 156,
an audio memory interface 158,
an audio interface and mixer 160,
a peripheral controller 162, and
a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
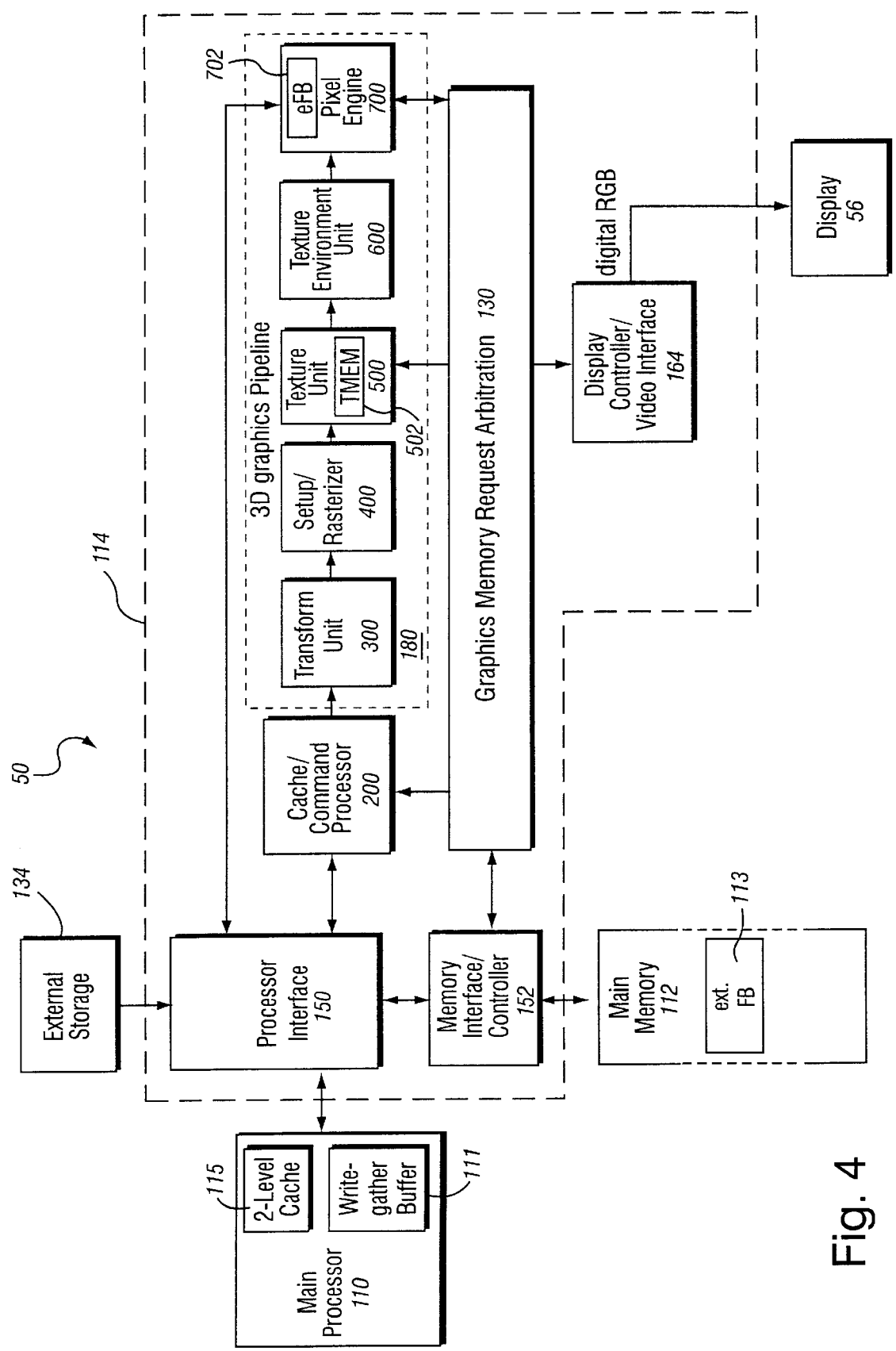
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164— which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing,
display lists 212 from main memory 112 via an on-chip call FIFO memory buffer 218, and
vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
- retrieving textures 504 from main memory 112,
- texture processing (500a) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500b), and
- indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha thresholding is not required).

The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

FIG. 5A is a more detailed block diagram of an example pipeline 118 including hidden surface removal that can be performed alternatively near the top or near the bottom of the pipeline. In this example, rasterize block 400b (see FIG. 5) comprises an edge and depth (z) rasterizer that produces, for each pixel being processed by the pipeline 118, x,y and z information along with a coverage mask indicating whether that particular pixel is covered by a primitive being rendered. In the specific embodiment shown, edge and z rasterizer 400b processes pixels four at a time, and provides the depth information in the form of the parameters specifying the plane equation for the surface. This is sufficient information to perform a depth comparison so long as the alpha channel is not activated. Accordingly, in such circumstances, the application programmer may command pixel engine 700 to perform hidden surface removal at the output of the edge and z rasterizer 400b before any texturing. This "top" depth comparison 700a' determines whether each pixel is hidden by a previously rendered surface, based on the contents of a z buffer 702z. In the example embodiment, the top z comparison 700a stores its results in a z buffer 702z within embedded frame buffer DRAM 702.

When the application programmer has commanded pixel engine 700 to provide a "top" depth comparison 700a', the pixel engine encodes the results of the depth comparison in the form of a modified coverage mask. The output of edge and z rasterizer 400b in this example provides a coverage mask that specifies whether the pixel is within or outside of the primitive. The "top" z compare 700a' can modify this coverage mask so it also indicates whether the pixel is obstructed by a previously rendered surface. "Top" z compare block 700a' provides this modified coverage mask to texture coordinate rasterizer 400r1 in this example. The texture coordinate rasterizer 400r1 examines the modified coverage mask and can discard the pixel based on the state of the coverage mask. In this particular example, the coverage mask is a simple single-bit flag (or, if supersampling for purposes of anti-aliasing is activated, the coverage mask may provide a single bit flag for each of a plurality of supersamples within the pixel).

When the top z compare block 700a' is activated, texture unit 500 need not waste its time generating a texture value at pixel locations that will be hidden from view. This can provide significant advantages in term of speed performance—especially in the case where texture unit 500 is a multi-cycle, recirculating texture unit providing such interesting and advantageous effects such as texture tiling and/or multi-texturing. Such texturing effects can add significant complexity and interest to an image, but they also can take a substantial amount of time to generate. The ability to discard pixels hidden from view before those pixels are processed by texture unit 500 can result in significant savings in terms of processing cycles. The saved processing cycles can be put to better use in generating additional scene complexity, or the image can be produced more rapidly.

Not all rendering modes supported by example pipeline 118 permit hidden surface removal to be performed prior to texturing a pixel. In particular, pipeline 118 can support an alpha channel in addition to the color (R, G, B) channels. As is well known, an alpha channel is very useful in providing a wide range of effects including, for example, transparency, cutouts and decaling. In the preferred embodiment, texture unit 500 supports textures having alpha values, e.g., to make cutout shapes (like billboard trees). When the alpha channel is activated, however, the fact that a surface at a particular pixel location is in front of a previously rendered surface at that same pixel location from the selected viewpoint is not enough information to resolve the hidden surface removal question. In particular, since the alpha channel permits modeling of surfaces and textures that are fully or partially transparent, a surface in front of another surface does not necessarily hide that other surface. Accordingly, when the alpha channel is turned on, it is not possible to discard pixels at an early stage based on whether or not the surface being rendered is in front of or behind a previously rendered surface relative to the current viewpoint. Therefore, in the example embodiment, the depth/hidden surface removal process is delayed in such rendering modes until after texturing, color blending and shading. The application programmer may command pixel engine 700 to perform the depth comparison at the bottom of the graphics pipeline (block 700a)—after the pixel has been fully processed by texture unit 500, color rasterizer 400r2 and texture environment unit 600.

In the example embodiment, the default location for hidden surface removal is at the bottom of graphics pipeline 118 (block 700a). However, the application programmer is encouraged to command pixel engine 700 to perform hidden surface removal near the top of the graphics pipeline 118 (activate top z compare block 700a') whenever possible to achieve better speed performance. However, when the texture environment unit 600a is performing alpha thresholding functions, the application programmer should command pixel engine 700 to perform the z comparison at the bottom of the graphics pipeline 118 (block 700a). When z compare occurs after texturing, the color and z are written to frame buffer 702 if both the z test and the alpha test pass. Application programmers should configure graphics pipeline 118 to perform z buffering after texturing to, for example, make cutout shapes (like billboard trees) that need to be correctly z buffered.

In one preferred implementation, pixel engine contains only one z unit that is alternately switched between the top and bottom of graphics pipeline 118 based on the state of a control register 701. Such an implementation saves chip real estate in a hardware implementation. Of course, duplicate or plural different z units could be provided in hardware or software logic, with one unit being activated while the other unit is set to provide a pass-through.

Example Process for Reconfiguring Graphics Pipeline 118

Figure 6:
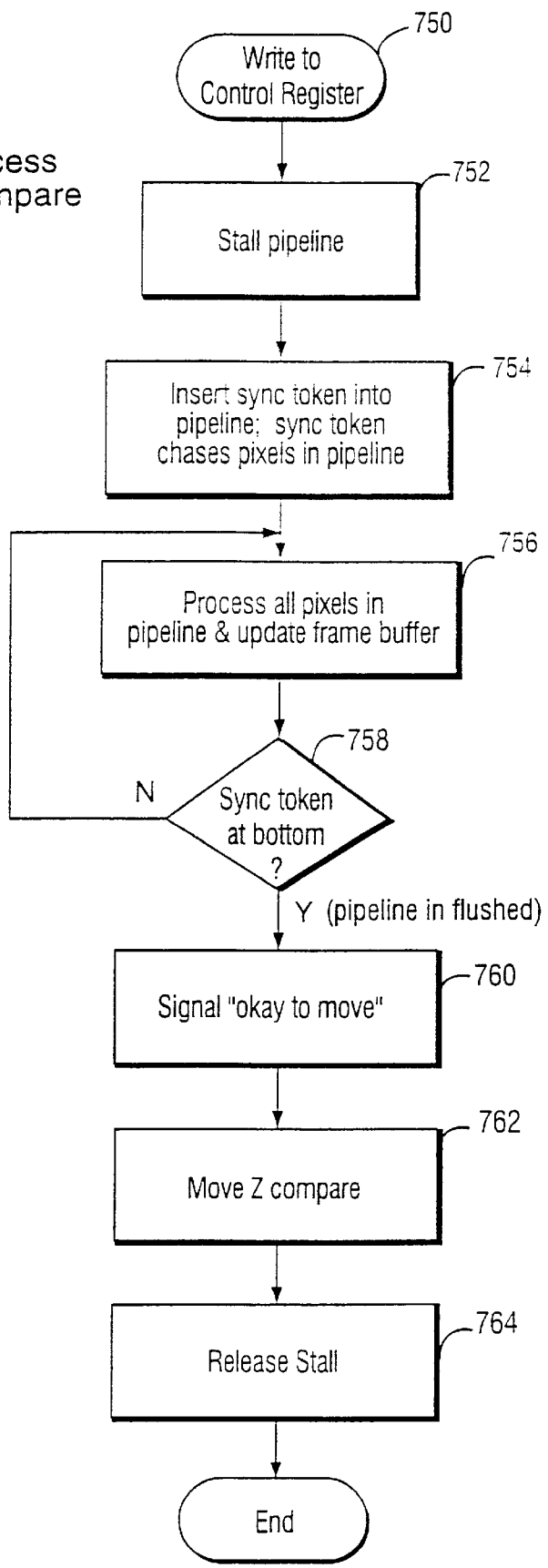
FIG. 6 is an example flowchart showing how to reconfigure a graphics pipeline.

FIG. 6 is a flowchart of an example process to reconfigure graphics pipeline 118 by moving the hidden surface removal operation within the pipeline. FIGS. 7A–7F provide a simplified, illustrative explanation of the example FIG. 6 reconfiguration operation. FIGS. 6 and 7A–7F illustrate, among other things, that there is a penalty to paid in terms of lost processing cycles each time graphics pipeline 118 is reconfigured in this manner. FIG. 8 shows a strategy for minimizing the penalty.

Figure 7A:
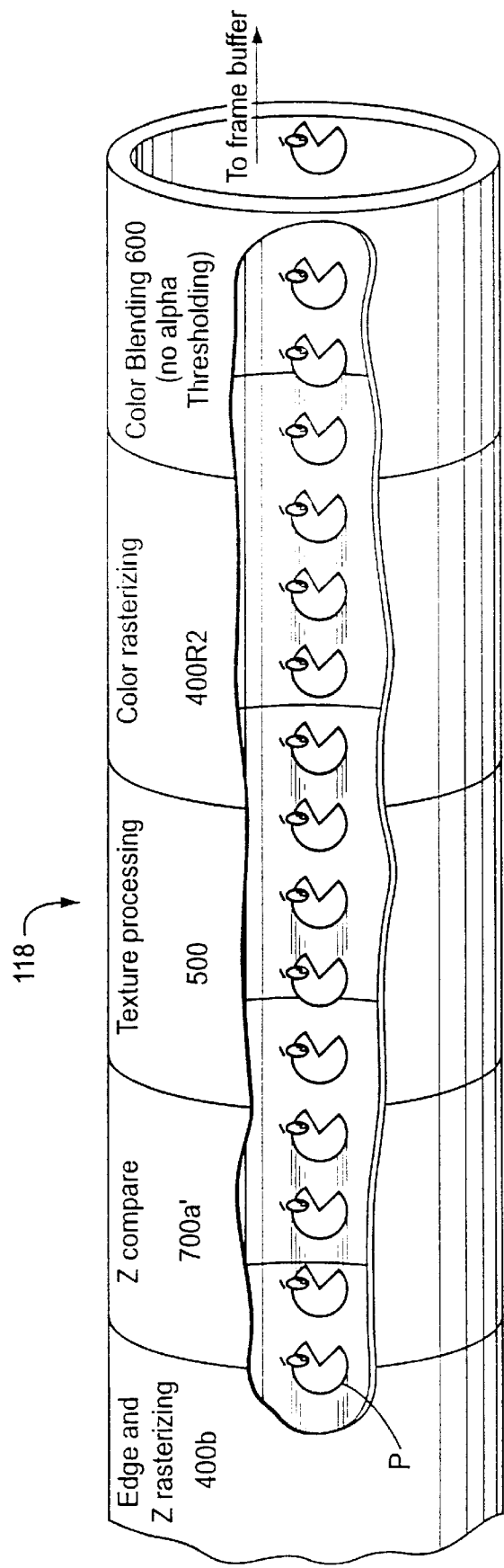
FIGS. 7A–7F are simplified illustrations of the FIG. 6 graphics pipeline reconfiguration process.

FIG. 7A is a simplified view of a graphics pipeline 118. In this simplified illustration, graphics pipeline 118 is illustrated as being an actual physical pipe carrying pixels P through the various processing stages of the pipeline. Of course, this is for purposes of illustration only; in an actual implementation, graphics pipeline 118 would be implemented by electronic circuitry and/or software code.

Figure 7B:
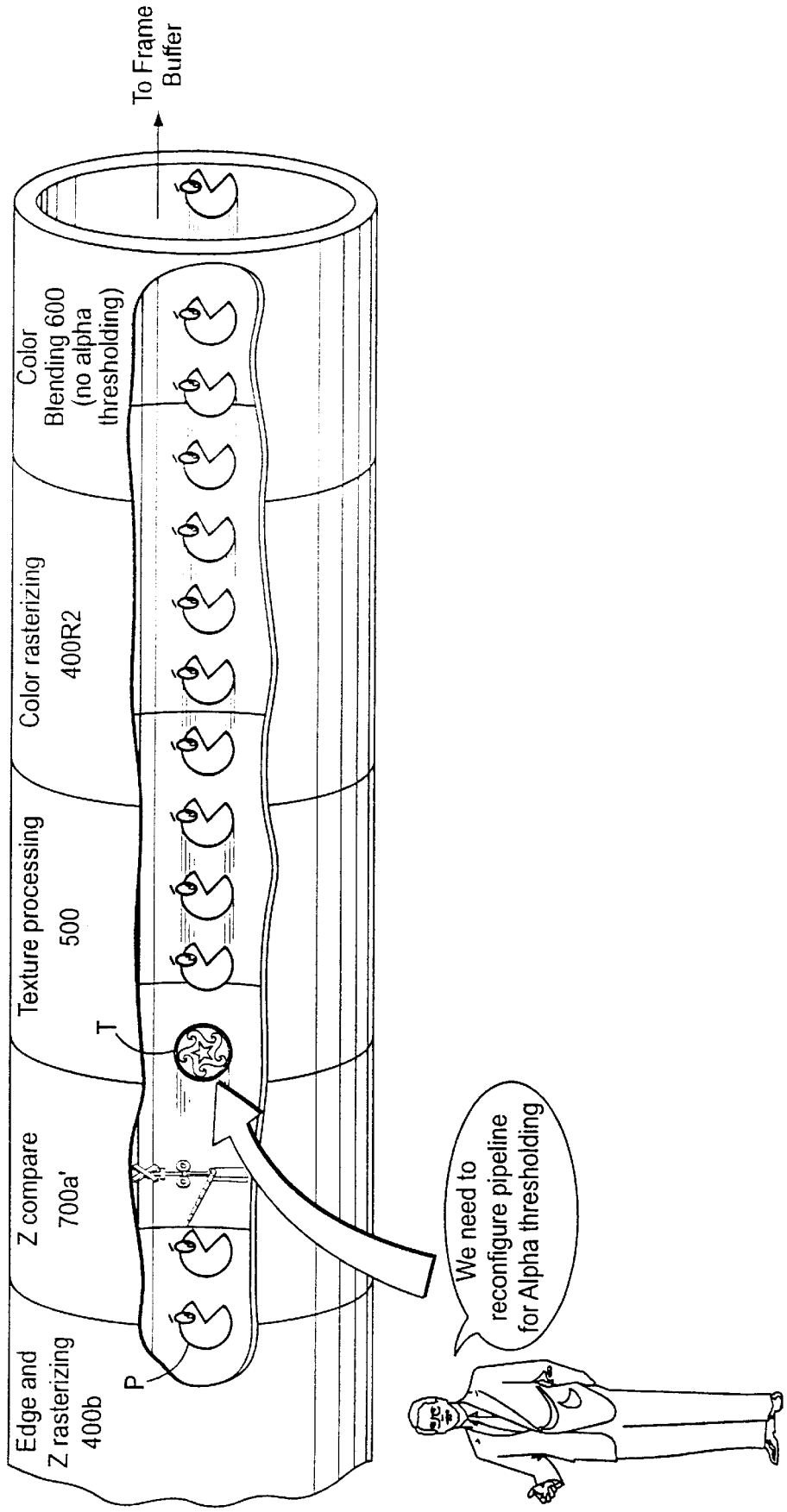
Figure 7C:
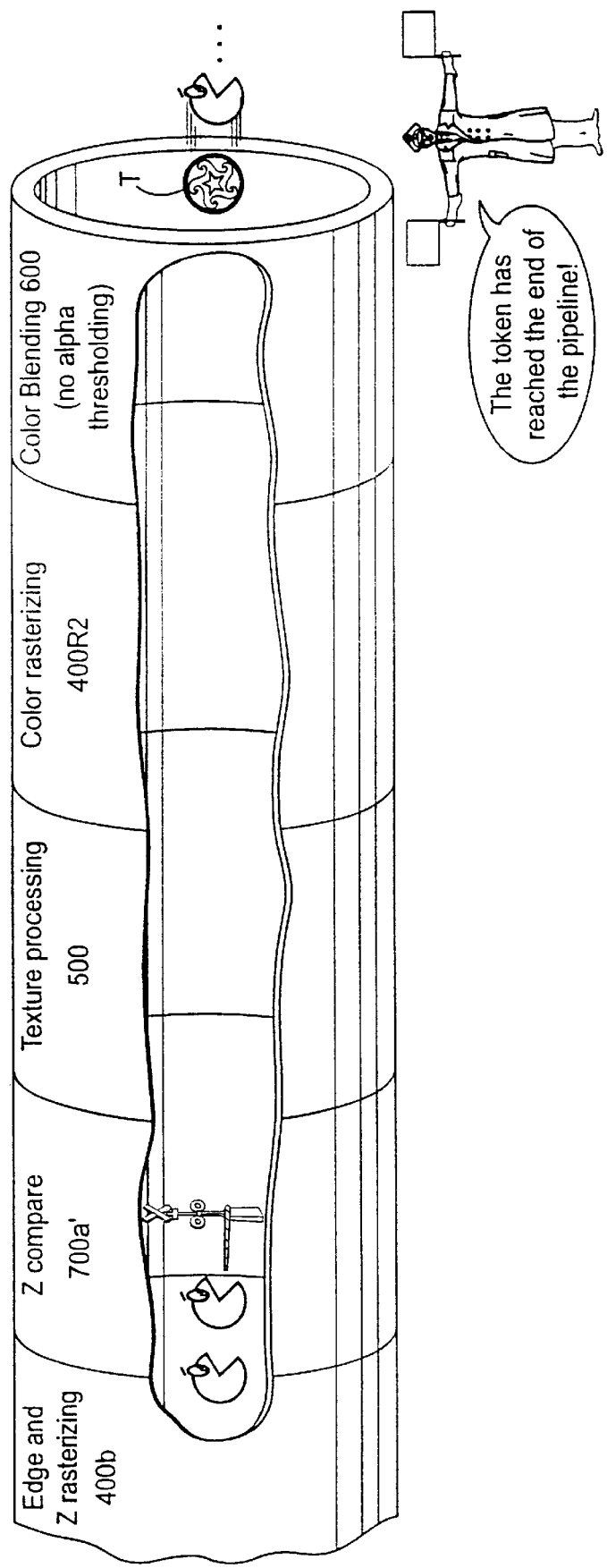

Referring to FIGS. 6 and 7A, assume that graphics pipeline 118 has been configured to perform the depth comparison and z buffering 700a' near the top of the graphics pipeline. Assume further that the applications programmer writes to pixel engine control engine 701 (see FIG. 6A) commanding the pixel engine to move the depth comparison operation to the bottom of the graphics pipeline 118 (block 700a in FIG. 5A) (e.g., to enable a rendering mode that uses alpha thresholding) (FIG. 6, block 750). In response to receipt of this command, pixel engine 700 stalls the graphics pipeline (FIG. 6, block 752). FIG. 7B illustrates this stall operation in a simplified form by showing a railroad crossing gate being lowered to prevent further pixels from passing down the graphics pipeline 118 while the pipeline reconfiguration is being dynamically performed.

In the example embodiment, pixel engine 700 inserts a token T into the pipeline (block 754). This synchronization token T chases the remaining pixels down the graphics pipeline as shown in FIG. 7B. Graphics pipeline 118 then processes all pixels remaining in the pipeline and updates the frame buffer based on the prior rendering mode (block 756). Pixel engine 700c an tell when all of the pixels in pipeline 118 have been processed and that the pipeline has been successfully flushed by looking for the synchronization token T at the end of the graphics pipeline (FIG. 6, block 758). When token T appears at the end of the graphics pipeline 118, pixel engine 700 generates a signal (see FIG. 7C) indicating that the token has arrived and hence that the pipeline has been completely flushed (FIG. 6, 760).

Figure 7D:
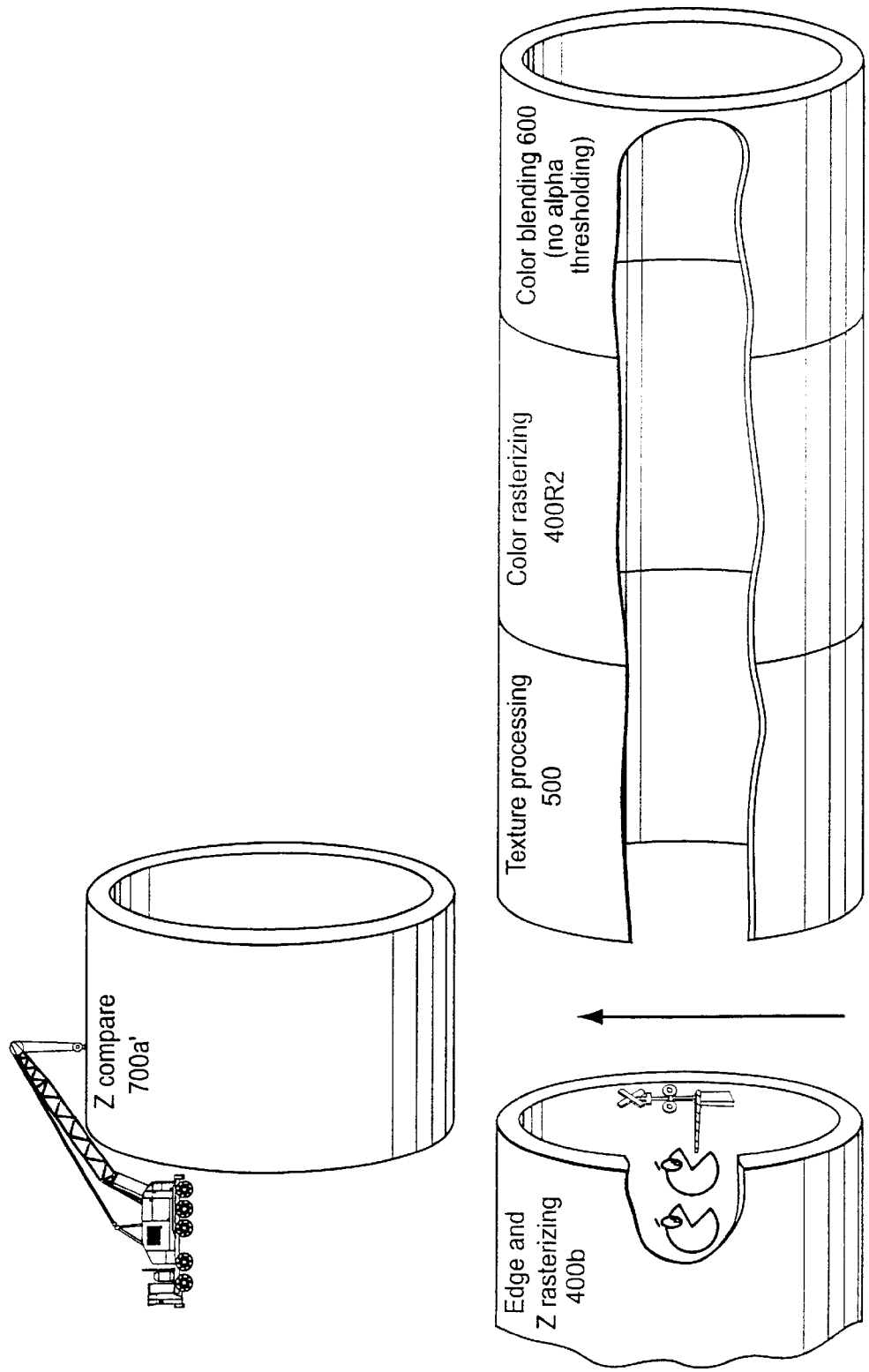
Figure 7E:
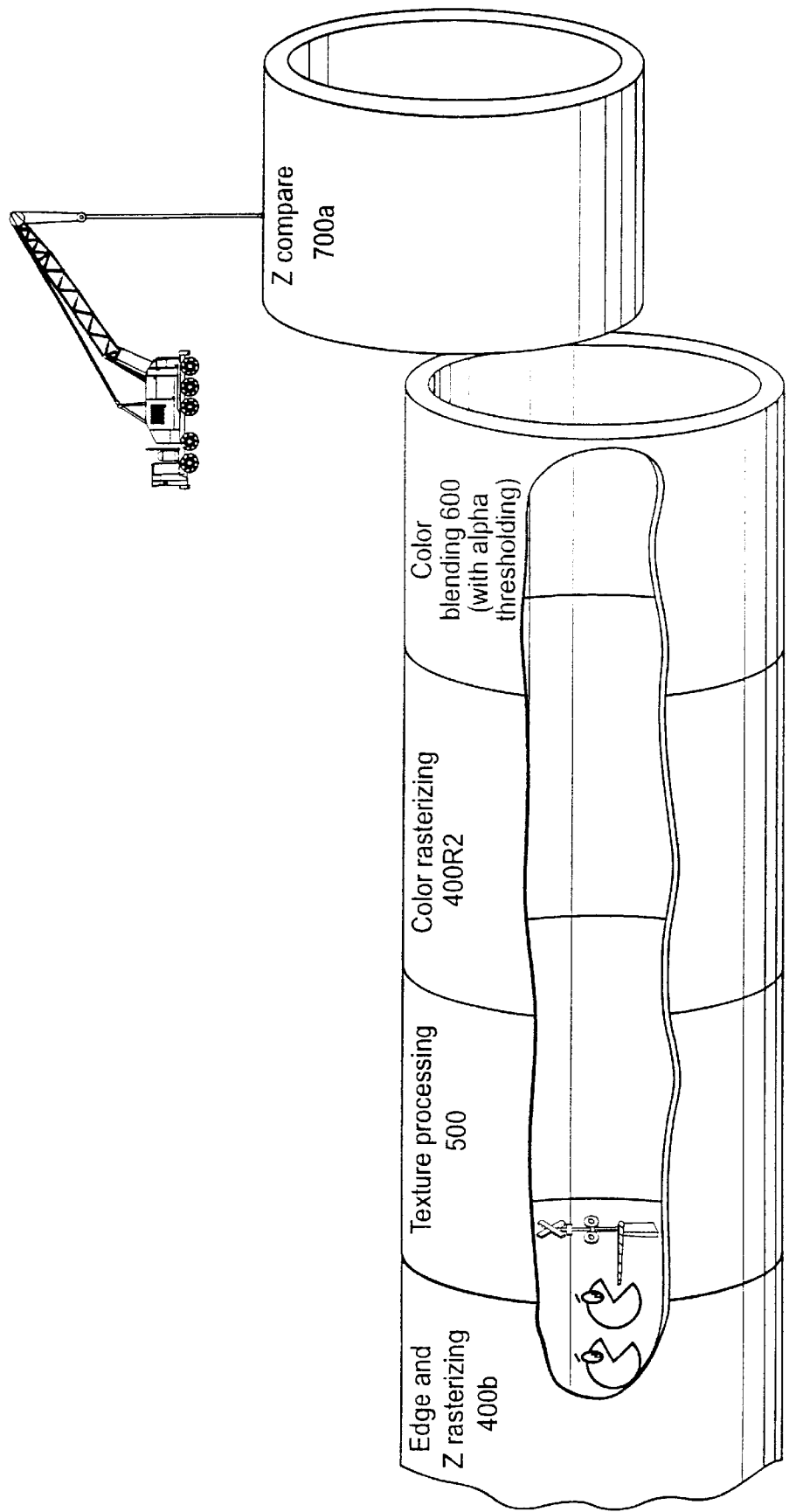
Figure 7F:
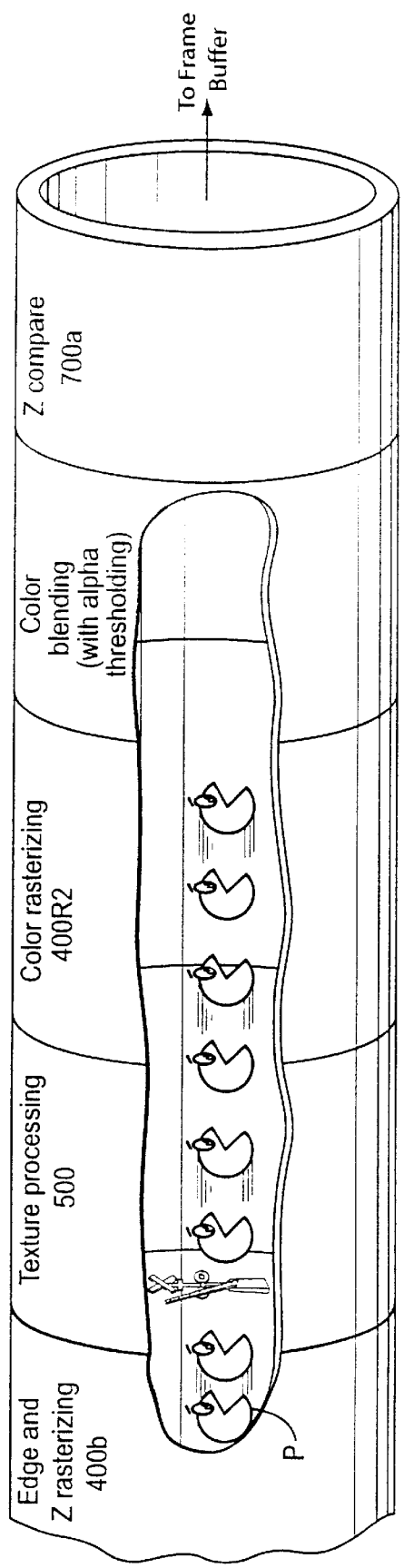

Once the pipeline has been flushed, pixel engine 700 reconfigures the graphics pipeline to move the depth comparison/depth buffering operation stage from the top of the pipeline (i.e., before texture processing) to the bottom of the pipeline (FIG. 6, block 762;see FIGS. 7D, 7E). Once the pipeline has been successfully reconfigured, pixel engine 700can release the stall (FIG. 6, block 764). This is illustrated by raising the railroad crossing gate in the FIG. 7F illustration. Pixels P can now flow through the reconfigured pipeline where hidden surface removal can now be based on alpha thresholding as well as depth comparison.

The same process in FIG. 6 can be used to reconfigure graphics pipeline 118 to move the z comparison from the bottom of the graphics pipeline to the top.

As you can see from the discussion above, there is a penalty to be paid when you dynamically reconfigure the graphics pipeline 118 in this way. In particular, the graphics pipeline 118 must be stalled and flushed before it is reconfigured, or else pixels in the pipeline will be lost and unexpected image results may occur. FIG. 8 shows one example process to dynamically reconfigure graphics pipeline 118 during rendering of a scene while minimizing the penalty. In this particular example, a scene is rendered by first setting the z compare to the top of the pipeline 118 (block 766) and then rendering all primitives that do not require alpha thresholding (block 768). When all such primitives are finished, one may then reconfigure graphics pipeline 118 to move the z compare to the bottom of the pipeline (block 770); and then, render the remaining primitives (i.e., ones with alpha) and update the frame buffer 702 based on both the results of an alpha test and a z test (block 772). The final scene may then be displayed.

Of course, blocks 766, 768 could be exchanged with blocks 770, 772 so that the primitive requiring alpha test could be rendered first and the primitives that do not require alpha test could be rendered thereafter. While it is possible to reconfigure the graphics pipeline 118 on a primitive-by-primitive basis, the penalty of doing so makes this an unattractive option and it is therefore better to sort the primitives based on whether or not they require alpha if one is dynamically change rendering modes in the middle of rendering a scene.

Example z Compare/Depth Buffering Logic

FIG. 9 shows an example implementation of blocks 700a, 700a'. The FIG. 9 example provides a series of multiplexers 776 that switch alternatively between the output of the edge and z rasterizer 700b and the output of texture environment unit 600a. The multiplexers 776 are controlled by the state of a "z TOP" control bit within an example pixel engine control register 701 shown in FIG. 10. Multiplexers 776 select the output of edge and z rasterizer 400b when depth comparison/buffering is to be performed at the top of the pipeline, and select the output of texture environment unit 600 when the depth comparison/buffering is to be performed at the bottom of the pipeline.

The example z unit logic shown in FIG. 9 further includes six evaluators 778 and six z comparators 780. In this example implementation, the z evaluators 778 solve the plane equation for a pixel quad to reduce the number of wires. In particular, a single 28-bit quad Z with the format of 27.1 and $Z_x$ and $Z_y$ with the format s26.5 are sent to z unit 700a, 700a'. The quad Z is the value of pixel z at the center of the pixel quad. The z evaluation units 778 use 28 bit adders to perform the following equation:

$$Z(dx,dy)=Z+(Zx)(dx)+(Zy)(dy)$$

where the x and the y are based on the pixel number and sample location. In the particular example, the upper three bits of the adder are for overflow/underflow clamping. Clamping is done based on the following:

000 no overflow/underflow 01x overflow, clamp to 0xffffff

0x1overflow, clamp to 0xffffff

1xx underflow, clamp to 0x000000

In the particular example shown, the Z comparison logic blocks 780 compare the output of z evaluators 778 with values read from z buffer 702z. These values read from z buffer are depicted in this example as "Zdst." In this particular example implementation, the values from z buffer 702z are 96-bit values. In one particular example, these stored values can be compressed and decompressed to achieve different levels of precision based on near-to-far ratio.

As shown in FIG. 9, the main CPU 110 also has access to the FIG. 9 z unit via a line "CPU z". A set of multiplexers 782 can be used to select between the output of the z evaluation blocks 778 and a z value supplied by CPU 110 for purposes of making a z comparison 780.

The FIG. 10 example control register 701 provides a "z top" control bit that may be set to 0 when z buffering is performed at the end of the graphics pipeline 118 and may be set to 1 for z buffering before texture mapping. Control register 701 also provides the ability to select between different z compression modes (e.g., linear z compression, 14e2 z compression, 13e3 z compression, 12e4 z compression, or inverted versions of these). Control regis-ters for register 701 also may allow the programmer to select between different pixel types for storage into color frame buffer 702c.

In the example embodiment, writing to control register 701 causes the pipeline stages between the edge and z rasterizer 400b and the end of the pipeline to be flushed as described above in connection with FIGS. 6 and 7A–7F. This flushing operation can take a minimum of 90 cycles in one example embodiment. This same flushing operation can also be used as a way to synchronize texture copy operations with rendering a primitive that uses the texture being copies (e.g., in order to ensure that the entire texture being copied has been written to the frame buffer before texture unit 500 attempts to use it as a texture).

It may be necessary to balance the graphics pipeline when the FIG. 9 z unit is switched to the "bottom" z compare position. FIG. 11 shows an example pipeline balancing technique that uses a first-in-first-out buffer 790 to buffer color information while some or all of the hidden surface removal operation is performed.

Example API Command Formats

The following are example API (applications programmer interface) commands that may be used in graphics system 50 to dynamically move the location of hidden surface removal within the pipeline:

GXSetZCompLoc

Description

This function sets whether Z buffering happens before or after texturing. Normally, Z buffering should happen before texturing, as this enables better performance by not texturing pixels that are not visible. However, when alpha compare is used, Z buffering should be done after texturing (see GXSetAphaCompare).

Arguments:

| | |
|---|---|
| before_tex | Enables Z-buffering before texturing when set to GX_TRUE. Otherwise, Z-buffering takes place after texturing. |

Example Usage:

void GXSetZCompLoc ( GXBool before_tex);

GXSetZMode

Description

This function sets the Z-buffer compare mode. The result of the Z compare is used to conditionally write color values to the Embedded Frame Buffer (EFB).

When compare_enable is set to GX_DISABLE, Z buffering is disabled and the Z buffer is not updated.

The func parameter determines the comparison that is performed. In the comparison function, the newly rasterized Z value is on the left while the Z value from the Z buffer is on the right. If the result of the comparison is false, the newly rasterized pixel is discarded.

The parameter update_enable determines whether or not the Z buffer is updated with the new Z value after a comparison is performed. This parameter also affects whether the Z buffer is cleared during copy operations, see GXCopyDisp and GXCopyTex.

Arguments:

| | |
|---|---|
| compare_enable | Enables comparisons with source and destination Z values if GX_TRUE. Disables compares otherwise. |
| func | Z compare function. Accepted values are: GX_NEVER, GX_LESS, GX_LEQUAL, GX_EQUAL, GX_NEQUAL, GX_GEQUAL, GX_GREATER, GX_ALWAYS. |
| update_enable | Enables Z-buffer updates when GX_TRUE. Otherwise, Z-buffer updates are disabled, but compares may still be enabled. |

Example Usage:

```
void GXSetZMode (
    GXBool      compare_enable,
    GXCompare   func,
    GXBool      update_enable );
```

GXSetAlphaCompare

Description

This function sets the parameters for the alpha compare function which uses the alpha output from the last active Texture Environment (TEV) stage. The number of active TEV stages are specified using GXSetTevStages.

The output alpha can be used in the blending equation (see GXSetBlendMode) to control how source and destination (frame buffer) pixels are combined.

The alpha compare operation is:

$$alpha\_pass=(alpha\_src(comp0)ref0)(op)(alpha\_src(comp1)ref1)$$

where alpha_src is the alpha from the last active TEV stage. As an example, you can implement these equations:

$$alpha\_pass=(alpha\_src>ref0) \text{ AND } (alpha\_src<ref1)$$

$$alpha\_pass=(alpha\_src>ref0) \text{ OR } (alpha\_src<ref1)$$

The Z compare can occur either before or after texturing, see GXSetZCompLoc. In the case where Z compare occurs before texturing, the Z is written based only on the Z test. The color is written if both the Z test and alpha test pass.

When Z compare occurs after texturing, the color and Z are written if both the Z test and alpha test pass. When using texture to make cutout shapes (like billboard trees) that need to be correctly Z buffered, you should configure the pipeline to Z buffer after texturing.

comp0 Comparison subfunction 0.

ref0 Reference value for subfunction 0, 8-bit.

op Operation for combining subfunction0 and subfunction1. Accepted values are: GX_AOP_AND, GX_AOP_OR, GX_AOP_XOR, GX_AOP_XNOR.

comp1 Comparison subfunction 1.

ref1 Reference value for subfunction 1, 8-bit

Example Usage:

```
void GXSetAlphaCompare (
    GXCompare   comp0,
    u8          ref0,
    GXAlphaOp   op,
```

-continued

```
    GXCompare   comp1,
    u8          ref1 );
```

GXSetBlendMode

Description:

This function determines how the source image, generated by the graphics processor, is blended with the Embedded Frame Buffer (EFB). Color updates should be enabled by calling GXSetColorUpdate. When type is set to GX_BM_NONE, the source data is written directly to the EFB. When type is set to GX_BM_BLEND, the source color and EFB pixels are blended using the following equation:

$$dst\_pix\_clr=src\_pix\_ctr*src\_factor+dst\_pix\_clr*dst\_factor$$

The GX_BL_DSTALPHA/GX_BL_INVDSTALPHA can be used when the EFB has GX_PF_RGBA6_Z24 as the pixel format (see GXSetPixelFmt). If the pixel format is GX_PF_RGBA6_Z24 then the src_factor and dst_factor are also applied to the alpha channel. To write the alpha channel to the EFB you may call GXSetAlphaUpdate.

When type is set to GX_BM_LOGIC, the source and EFB pixels are blended using logical bit-wise operations.

Arguments:

| | |
|---|---|
| type | Blending mode. Accepted values are: GX_BM_NONE, GX_BM_BLEND, GX_BM_LOGIC |
| src_factor | Source factor. The pixel color produced by the graphics processor is multiplied by this factor. Accepted values are shown in the following table: |

| Name | Factor Description |
|---|---|
| GX_BL_ZERO | 0.0 |
| GX_BL_ONE | 1.0 |
| GX_BL_DSTCLR | frame buffer color |
| GX_BL_INVDSTCLR | 1.0 - (frame buffer color) |
| GX_BL_SRCALPHA | source alpha |
| GX_BL_INVSRCALPHA | 1.0 - (source alpha) |
| GX_BL_DSTALPHA | frame buffer alpha |
| GX_BL_INVDSTALPHA | 1.0 - (frame buffer alpha) |

| | |
|---|---|
| dst_factor | Destination factor. The current frame buffer pixel color is multiplied by this factor. Accepted values are shown in the following table: |

| Name | Factor Description |
|---|---|
| GX_BL_ZERO | 0.0 |
| GX_BL_ONE | 1.0 |
| GX_BL_SRCCLR | source color |
| GX_BL_INVSRCCLR | 1.0 - (source color) |
| GX_BL_SRCALPHA | source alpha |
| GX_BL_INVSRCALPHA | 1.0 - (source alpha) |
| GX_BL_DSTALPHA | frame buffer alpha |
| GX_BL_INVDSTALPHA | 1.0 - (frame buffer alpha) |

-continued

| op | Blend operation. Accepted values, and the logic operation is shown in the table: | |
|---|---|---|
| | Name | C-language equivalent bit-wise operation |
| | GX_LO_CLEAR | dst = 0 |
| | GX_LO_SET | dst = 1 |
| | GX_LO_COPY | dst = src |
| | GX_LO_INVCOPY | dst = ~src |
| | GX_LO_NOOP | dst = dst |
| | GX_LO_INV | dst = ~dst |
| | GX_LO_AND | dst = src & dst |
| | GX_LO_NAND | dst = ~(src & dst) |
| | GX_LO_OR | dst = src \| dst |
| | GX_LO_NOR | dst = ~(src \| dst) |
| | GX_LO_XOR | dst = src ^ dst |
| | GX_LO_EQUIV | dst = ~(src ^ dst) |
| | GX_LO_REVAND | dst = src & ~dst |
| | GX_LO_INVAND | dst = ~src & dst |
| | GX_LO_REVOR | dst = src \| ~dst |
| | GX_LO_INVOR | dst = ~src \| dest |

Example Usage:

```
void GXSetBlendMode (
    GXBlendMode    type,
    GXBlendFactor  src_factor,
    GXBlendFactor  dst_factor,
    GXLogicOp      op );
```

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers, and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 12A:
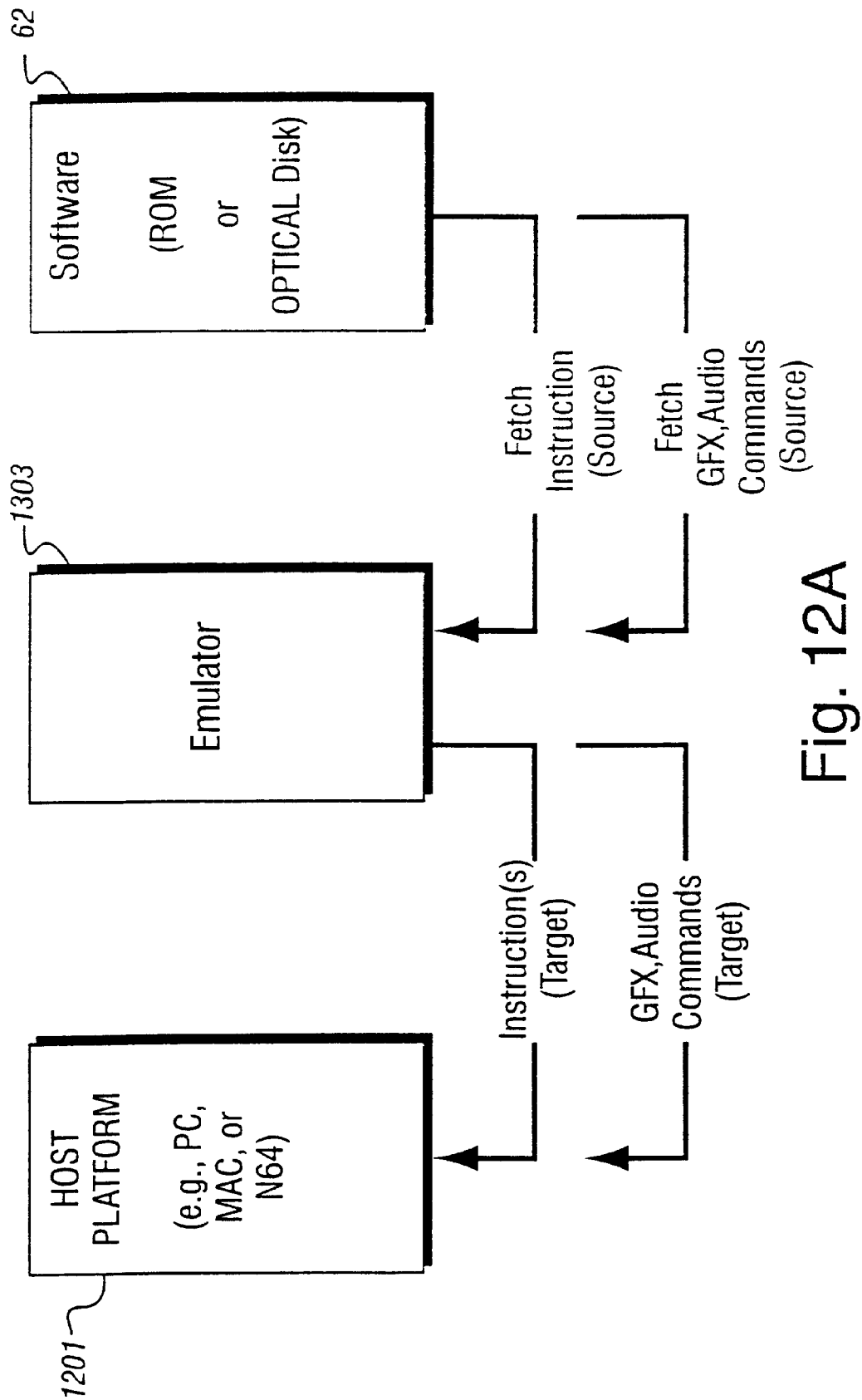
FIGS. 12A and 12B show example alternative compatible implementations.

FIG. 12A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

Certain emulators of system 50 might simply "stub" (i.e., ignore) the commands to move the hidden surface removal operation within the graphics pipeline 118. It is always possible to perform z buffering at the end of the graphics pipeline since z buffering at that location will work for all rendering modes. However, if the application writes to control register 701 (e.g., address 0x43 within the register address space provided by system 50), an emulator or other platform that ignores such a write does so at the risk of not performing a synchronization the application programmer may expect. This could result in anomalous imaging effects under certain circumstances. Therefore, some such emulators may respond to such a command to provide synchronization between events (e.g., texture copy operations) occurring within different parts of the pipeline.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 12B:
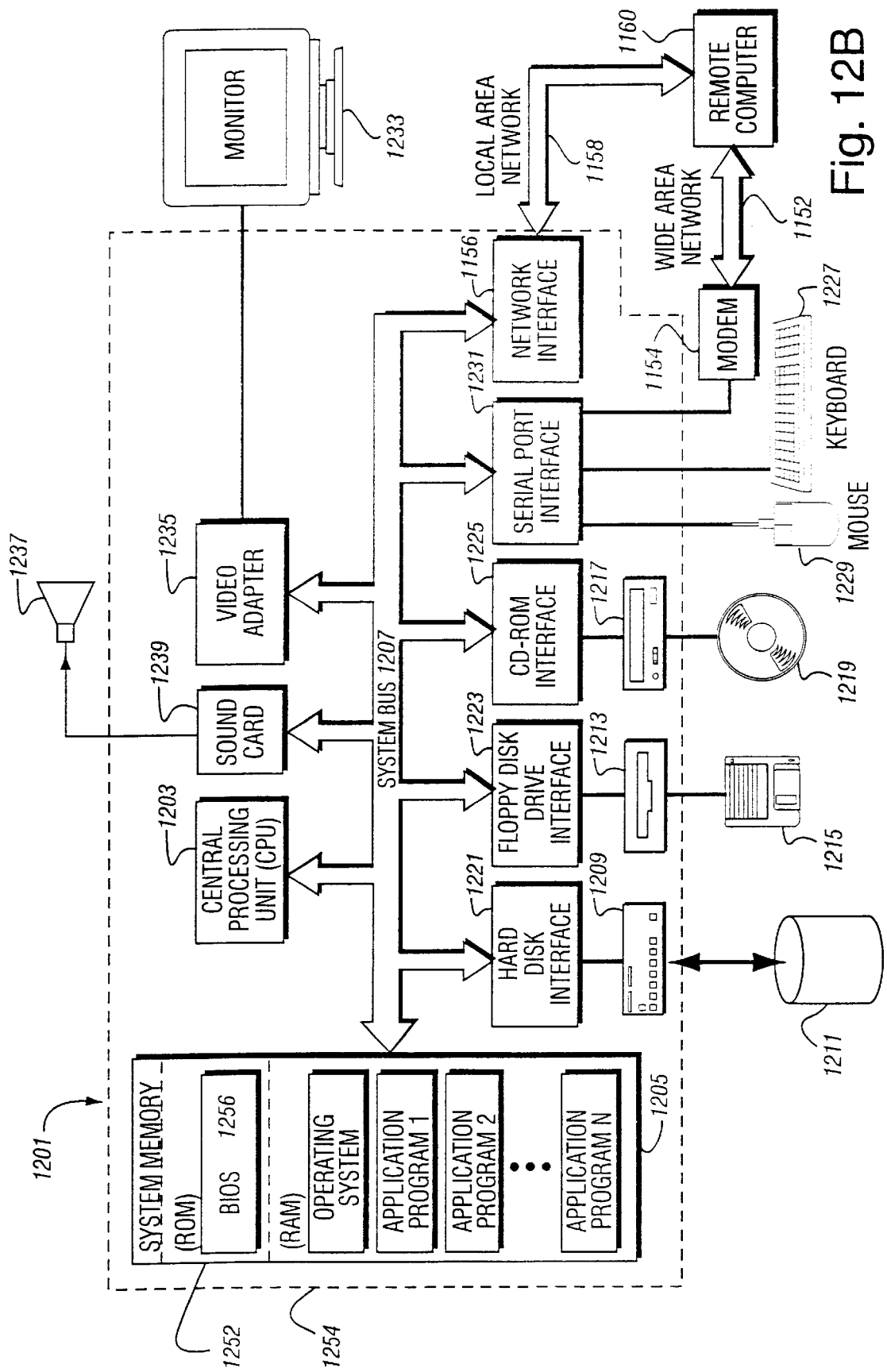

FIG. 12B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referred to above are hereby incorporated by reference into this specification as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A graphics pipeline comprising:
    a z and edge rasterizer having a first input;
    a texture unit having a second input;
    at least one z compare unit; and
    an arrangement coupled to the at least one z compare unit that selectively, alternatively couples the z compare unit to the first input or the second input.

2. The apparatus of claim 1 wherein the apparatus further comprises switches to switch said z compare unit between the first and second inputs.

3. A graphics pipeline having at least first and second alternate rendering modes, and comprising:
    a z an edge rasterizer having a first input;
    a texturing stage having a second input;
    a hidden surface removal stage; and
    a reconfiguration arrangement that selectively connects the hidden surface removal stage alternately to the first input or to the second input within the graphics pipeline depending upon the graphics pipeline rendering mode.

4. The apparatus of claim 3 wherein the texturing stage also has an output and the reconfiguration arrangement includes switches that switch the hidden surface removal stage between the texturing stage input and the texturing stage output.

5. The apparatus of claim 4 wherein the texturing unit includes an alpha channel, and the reconfiguration arrangement activates the hidden surface removal stage at the texturing stage output when the alpha channel is active.

6. The apparatus of claim 3 wherein the hidden surface removal stage includes a z comparator.

7. The apparatus of claim 3 wherein the hidden surface removal stage includes a z buffer.

8. The apparatus of claim 3 wherein the reconfiguration arrangement is controlled in response to a register.

9. The apparatus of claim 3 wherein the reconfiguration arrangement flushes the graphics pipeline before moving the hidden surface removal stage.

10. A method of reconfiguring a graphics pipeline including a pixel engine the method comprising:
    receiving a command;
    stalling a graphics pipeline in response to the received command;
    inserting a synchronization token into the graphics pipeline that chases pixels within the graphics pipeline while the pipeline is stalled;
    detecting with the pixel engine, when the synchronization token has reached a predetermined point in the graphics pipeline to confirm the graphics pipeline has been flushed;
    the pixel engine reconfiguring the graphics pipeline in response to such detection of the token by the pixel engine to reposition a hidden surface removal stage within the pipeline; and releasing the stall.

11. A graphics pipeline comprising:

at least one processing stage including selectively activatable alpha thresholding, said processing stage including a z and edge rasterizer having a first input and a texture unit having a second input; and a hidden surface removal stage that is selectively alternately coupled to said first input or to said second input based at least in part on whether alpha thresholding is activated.

12. A pixel engine comprising:

a first input coupled to a z and edge rasterizer;

a second input coupled to a texture environment unit; and a z unit that is selectively, alternately coupled to said first input or said second input.

13. The apparatus of claim 12 wherein said pixel engine couples the z unit to the first input or to the second input based on rendering mode.

* * * * *